(12) United States Patent
Inoue et al.

(10) Patent No.: US 6,650,692 B2
(45) Date of Patent: Nov. 18, 2003

(54) CDMA RECEIVER

(75) Inventors: Takeshi Inoue, Yokohama (JP);
Masahiko Shimizu, Kawasaki (JP);
Takashi Dateki, Kawasaki (JP); Koji Matsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 202 days.

(21) Appl. No.: 09/943,437

(22) Filed: Aug. 29, 2001

(65) Prior Publication Data

US 2002/0034215 A1 Mar. 21, 2002

Related U.S. Application Data

(63) Continuation of application No. PCT/JP99/00961, filed on Mar. 1, 1999.

(51) Int. Cl.[7] .......................... H04K 1/00; H04B 7/216
(52) U.S. Cl. ................... 375/147; 370/342; 370/335
(58) Field of Search ......................... 375/130, 147, 375/140; 370/342, 335

(56) References Cited

U.S. PATENT DOCUMENTS 6,487,193 B1 * 11/2002 Hamada et al. ............. 370/342

FOREIGN PATENT DOCUMENTS

| JP | 08181636 | 7/1996 |
| JP | 08256084 | 10/1996 |
| JP | 09181704 | 7/1997 |
| JP | 10117157 | 5/1998 |

\* cited by examiner

*Primary Examiner*—Temesghen Ghebretinsae
(74) *Attorney, Agent, or Firm*—Katten Muchin Zavis Rosenman

(57) ABSTRACT

A path search unit (1) detects the correlation between a received signal and a desired signal; (2) based on the correlation value, selects a plurality of paths over which the desired signal arrives; (3) if the difference between the detection time of the desired signal arriving via a path selected this time and the previous-time detection signal is within an allowable range, judges that the path selected this time is identical to a path previously allocated to prescribed finger units, and (4) if a path is identical, causes despreading and delay adjustment processing of the desired signal arriving over the selected path to be executed by the same finger unit as previously. A timing control unit calculates the difference between the detection time this time, over the identical path, and a reference time, and, based on the total of the time differences over the identical path, controls the timing lead/lag.

13 Claims, 30 Drawing Sheets

FIG. 17

| NUMBER OF VALID PATHS n | PER PATH | DETECTION RESULT (EXCLUDING CODES) V | | | | | | | | |
|---|---|---|---|---|---|---|---|---|---|---|
| | | 0 | 1 | 2 | 3 | 4 | 5 | 6 | 7 | 8 |
| 8 | 16 | 0 | 16 | 32 | 48 | 64 | 80 | 96 | 112 | 127 (128) |
| 7 | 18 | 0 | 18 | 36 | 54 | 72 | 90 | 108 | 127 (126) | — |
| 6 | 21 | 0 | 21 | 42 | 63 | 84 | 105 | 127 (126) | — | — |
| 5 | 25 | 0 | 25 | 50 | 75 | 100 | 127 (125) | — | — | — |
| 4 | 32 | 0 | 32 | 64 | 96 | 127 (128) | — | — | — | — |
| 3 | 42 | 0 | 42 | 84 | 127 (126) | — | — | — | — | — |
| 2 | 64 | 0 | 64 | 127 (128) | — | — | — | — | — | — |
| 1 | 127 | 0 | 127 | — | — | — | — | — | — | — |

EXPLANATION OF DLL S CURVE

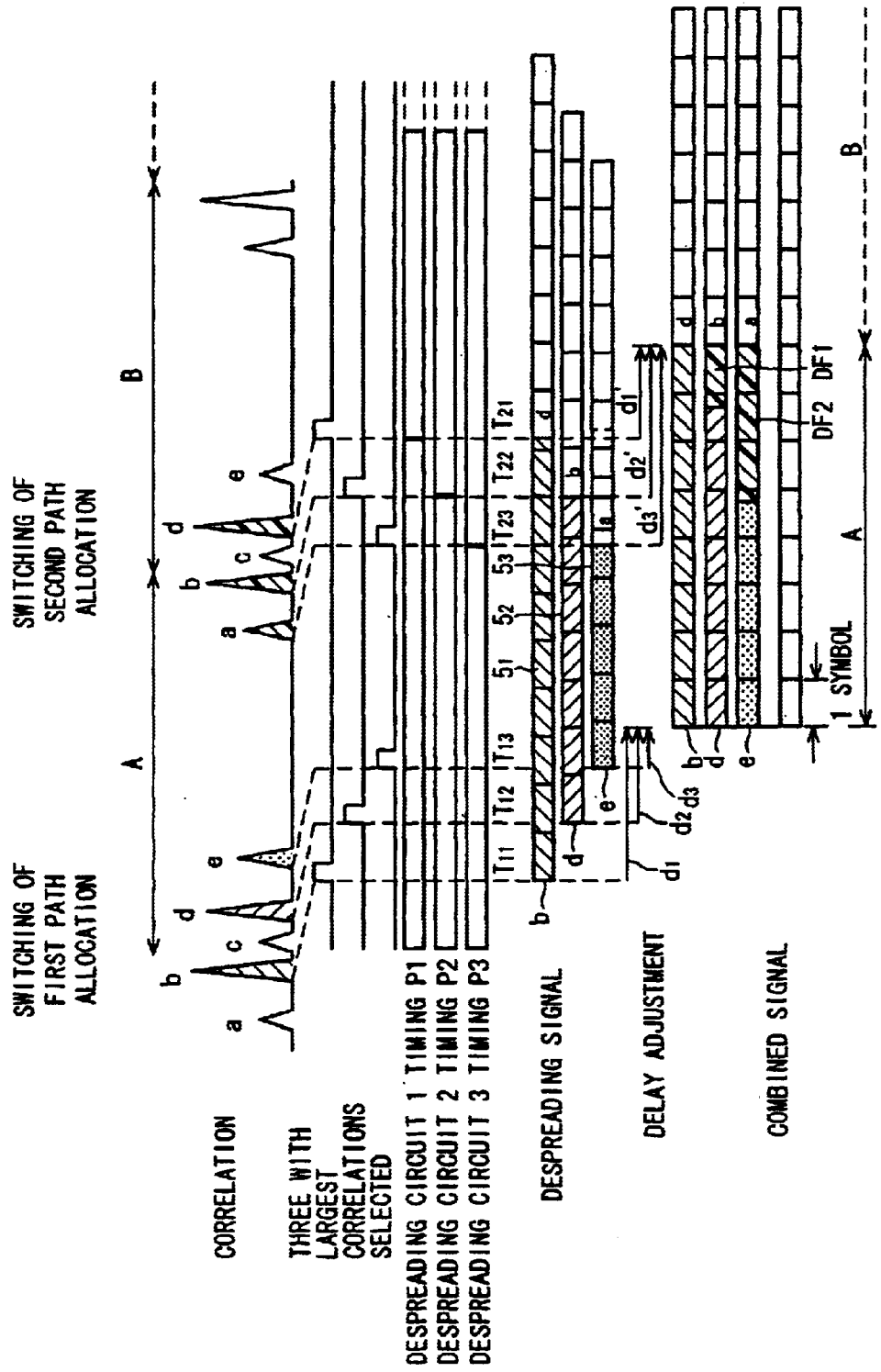

US 6,650,692 B2

CDMA RECEIVER

This application is a continuation of international application number PCT/JP99/00961, filed Mar. 1, 1999.

TECHNICAL FIELD

This invention relates to a CDMA receiver for direct sequence spread spectrum communications (hereafter "DS"), and more particularly to a CDMA receiver which can be synchronized with a reference timing.

BACKGROUND ART

Development of digital cellular wireless communication systems employing DS-CDMA (direct sequence code division multiple access) technology is being developed as a next-generation mobile communication system to achieve wireless multimedia communication. In this CDMA communication, a plurality of channels or information for transmission by the user is multiplexed by means of spreading codes, and is transmitted via wireless circuits or other transmission routes.

In mobile communications, random changes in amplitude and phase known as fading occur, having a maximum frequency determined by the velocity of the mobile object and the carrier wave frequency. Because of this, stable reception is extremely difficult compared with fixed wireless communication. Spread spectrum communication methods are effective as a means of reducing the degradation caused by the effects of such frequency-selective fading. Because signals in a narrow band are spread over a high-frequency band for transmission, even if a drop in received electric field intensity occurs in a specific frequency region, information can be restored without errors from other bands.

Further, when in mobile communications fading similar to that described above occurs due to the environment in the vicinity of the receiver caused by delayed waves resulting from distant tall buildings, mountains and similar, a multipath fading environment results. When using DS, these delayed waves become interference waves with respect to spreading codes, and so induce degradation of reception characteristics. The RAKE reception method is known as one method which can be used to effectively improve characteristics with respect to these delayed waves. In this method, despreading is performed for each delayed wave arriving via each of the multiple paths, the respective delay times are arranged, and combining is performed by weighting according to the reception level and adding.

FIG. 23 is an example of the configuration of a CDMA wireless device of the prior art; 1 is the transmission circuit, 2 is the reception circuit, 3 is a duplexer which sends transmission signals to the antenna and inputs reception signals to the reception circuit, and 4 is the antenna. In the transmission circuit 1, 1a is an encoder which encodes transmission signals (transmission data), and 1b is a mapping unit; for example, frame data (pilot signal and transmission data) is divided, alternating for each bit, into two series, I symbol data $D_I$, which is the same-phase component (I or in-phase component), and Q symbol data $D_Q$, which is the orthogonal component (Q or quadrature component). 1c and 1d are spreaders which perform spreading modulation on the I symbol data and Q symbol data $D_I$, $D_Q$ using prescribed spreading codes; 1e and 1f are waveform-shaping filters; 1g and 1h are D/A converters which perform D/A conversion of the output of the filters 1e, if; 1i is a quadrature modulation circuit which executes QPSK quadrature modulation of the I channel signal and Q channel signal and outputs the results; and 1j is a wireless unit which performs frequency conversion from IF to RF, high-frequency amplification, and other operations.

In the reception circuit 2, 2a is a wireless unit which performs frequency conversion from RF to IF, high-frequency amplification, and other operations; 2b is a quadrature detection circuit which uses orthogonal detection to demodulate the I channel and Q channel signals; 2c and 2d are A/D converters which convert the I channel and Q channel signals into digital data; 2e is a path search circuit which searches for multiple paths; 2f is a RAKE combining/demodulation unit which executes despreading for each of multiple paths, demodulates the the I symbol data $D_I'$ and Q symbol data $D_Q'$ obtained by despreading into the original data, and combines and outputs the demodulation results; and 2g is a decoder.

FIG. 24 is a schematic diagram of the path search unit 2e and RAKE combining/demodulation unit 2f. The RAKE combining/demodulation unit 2f has finger units $5_1$, $5_2$, $5_3$ provided for each path of multiple paths, and a RAKE combining unit 6 which combines the outputs of the finger units. The path search unit 2e comprises a matched filter (MF) 7a, an integration circuit 7b, a path selection section 7c, and a timing generation section 7d; multiple paths are detected, the time delays from the arrival times of signals arriving via each path among multiple paths, or from a reference time, are discriminated, and the timing data $P_1$ to $P_3$ for start of despreading for the finger units corresponding to each path, and time delay adjustment data $D_1$ to $D_3$, are input.

The reception level for signals sent from a transmitter vary according to the path among multiple paths as shown in FIG. 25, and also differ for different times of arrival at the receiver. The matched filter 7a outputs the auto-correlation of the desired signal contained in the reception signal. Because channel components other than the channel allocated to a matched filter 7a are also contained in the reception output of the antenna 4, the matched filter 7a uses the spreading code for its own channel to extract the signal component for its own channel (the desired signal) from the antenna reception signal, and outputs the result. In this case, the correlation values I, Q of the I channel signal and the Q channel signal are obtained independently, so that for example the calculation $(I+jQ)(I-jQ)=I^2+Q^2$ is performed to convert to a power value, which is output.

That is, when direct-sequence signals (DS signals) which have been affected by multiple paths enter the matched filter 7a, a pulse train is output which has a plurality of peaks corresponding to the arrival time delay and the received electric field intensity; after passing through the integration circuit 7b, this pulse train enters the path selection section 7c. In order to remedy the loss due to instantaneous level drops caused by fading, the integration circuit 7b takes a time average of the matched filter output, and inputs the result to the path selection section 7c. The path selection section 7c refers to the integration output (FIG. 25) of the integration circuit, detects multiple paths based on the multiple path signals $MP_1$, $MP_2$, $MP_3$ which are greater than a threshold value, detects each of the paths of the multiple paths and the time delays $t_1$, $t_2$, $t_3$, and inputs, to the finger units $5_1$, $5_2$, $5_3$ corresponding to each path, the timing data for start of despreading $P_1$, $P_2$, $P_3$ and the time delay adjustment data $D_1$, $D_2$, $D_3$. The multipath signals $MP_1$, $MP_2$, $MP_3$ are arranged in order of magnitude, and the path with the largest multipath signal is allocated to the first finger $5_1$, while the path with the second-largest multipath signal is allocated to the second finger $5_2$, and the path with the third-largest multipath signal is allocated to the third finger $5_3$; the processing described below is then performed on signals arriving via the paths assigned to each of these finger units.

The finger units $5_1, 5_2, 5_3$ corresponding to the paths have the same configuration, each having a despreading circuit 5a, demodulation circuit 5b, and delay circuit 5c. Each of the despreading circuits 5a uses the spreading code for its own channel to perform despreading processing of the received I channel signal and Q channel signal, with timing ($P_1$ to $P_3$) indicated by the path search unit 2e. The demodulation circuit 5b uses the I symbol data $D_I'$ and Q symbol data $D_Q'$, obtained from despreading, to demodulate to obtain the original data; the delay circuit 5c outputs this data with a delay ($D_1$ to $D_3$) indicated by the path search unit 2e. As a result, each of the finger units performs despreading with the same timing as the spreading codes of the transmitter, and adjusts the time delays according to the path, arranges the phases and inputs the signals to the RAKE combining unit 6; the RAKE combining unit 6 combines the input signals for output.

FIG. 26 shows an example of the configuration of the despreading circuit in a finger unit; despreading processing is performed on the I channel signals and on the Q channel signals. 8a is a spreading code generator unit which generates the same spreading codes as the transmitter; the code length is the number of chips per symbol N, for example, 256. 8b is a multiplier which multiplies the I channel signal and the spreading code for each chip; 8b' is a multiplier which multiplies the Q channel signal and the spreading code for each chip; 8c and 8c' are integrators which integrate the multiplication result over one symbol period (256 cumulative additions); 8d and 8d' are adders; 8e and 8e' are one-chip time delay circuits; and 8f and 8f' are output registers which use the symbol clock to latch the one-symbol period cumulative result and output the I symbol data $D_I'$, $D_Q'$.

To summarize the above, in the matched filter 7a of the path search unit 2e, the correlation between the received signal and the desired signal (the expected spreading code train) is determined, the path for which this correlation is large is selected by the path selection section 7c, and the despreading circuit 5a is notified of the time difference. In FIG. 24, despreading is performed for three paths with large integration outputs of correlations.

The arrival times $t_1, t_2, t_3$ of three apparently certain paths detected in this way are taken to be the despreading timing of the despreading circuits 5a in the respective finger units $5_1, 5_2, 5_3$. In each of the despreading circuits 5a, despreading codes are generated according to the despreading timing obtained in this way, and despreading of received data is performed. If there is phase modulation, the oritinal data is restored from the I, Q symbol data obtained by despreading by means of the demodulation circuit 5b. Then, the positions of the restored data are aligned by using the delay circuits 5c to shift the two faster signals to agree with the slowest signal, based on the respective delay amounts. By adding these, a combined signal is obtained. This result is subjected to "0" and "1" judgment by the comparator of a data judgment unit, not shown, and the result is taken to be the received data. In some cases, maximal ratio combining is performed by multiplying by a reliability corresponding to the respective reception levels and then adding, prior to combining by the RAKE combining unit 6.

In the above explanation, no DLL (delay locked loop) circuit is provided; but in actuality, as shown in FIG. 27, DLL circuits $9_1$ to $9_3$ are provided between the path search unit 2e and each of the finger units $5_1, 5_2, 5_3$. Even if the path search unit 2e acquires the synchronization, if nothing further is done, fluctuations in the system clock frequency, changes in distance between transmitter and receiver, the effects of noise and other factors will cause the synchronization position to be lost. Hence when acquisition of synchronization using the correlator 7a' is successful, control must be exercised such that despreading code trains on the receiving side are not shifted in time (synchronization tracking). The DLL circuits $9_1$ to $9_3$ exercise control such that the despreading timing in the finger units $5_1$ to $5_3$ is synchronized with the timing indicated by the initial timing data generation section 7d of the path search unit 2e.

FIG. 28 is a schematic diagram of the DLL circuit. 9a is a despreading code generator which cyclically generates a despreading code train A1 for N chips in each symbol interval; initial values are loaded according to timing data output from the initial timing generator 7d. 9b is a delay circuit which delays the despreading code train $A_1$ by one chip period and outputs a second despreading code train $A_2$; 9c and 9d are multipliers which multiply the despreading codes $A_1$, $A_2$ by a carrier signal; 9e is a multiplier which multiplies the first despreading code train $A_1$ and the received signal (received spreading code train) B for each chip; 9f is a multiplier which multiplies the second despreading code train $A_2$, delayed by one chip, and the received spreading code train B for each chip; 9g and 9h are band-pass filters; 9i and 9j are envelope detectors; 9k is an adder which adds the output of the envelope detector 9i and the inversion of the code of the output of the envelope detector 9j; 9m is a low-pass filter; 9n is a voltage-controlled oscillator (VCO) with clock frequency (chipping rate) variable based on the low-pass filter output; and 9p is a counter which counts the chip clock and outputs a despreading timing signal.

The multiplier 9e has a function for calculating the correlation between the despreading code train $A_1$ and the received spreading code train B; the correlation is maximum if these codes are in phase. Hence the envelope detector 9i outputs the correlation R($\tau$)=1 for one chip period for each symbol, as shown in FIG. 29A, and if the phase is shifted by one chip period or more outputs the correlation R($\tau$)=1/N. The multiplier 9f has a function for calculating the correlation between the second despreading code train $A_2$ and the received spreading code train B; the correlation is maximum if these codes are in phase. Hence the envelope detector 9j outputs the correlation R($\tau$)=1 for one chip period for each symbol, as shown in FIG. 29B, and if the phase is shifted by one chip period or more outputs the correlation R($\tau$)=1/N. The adder 9k adds the inversion of the code of the output of the envelope detector 9i and the output of the envelope detector 9j, and by this means outputs via the low-pass filter 93 a signal having the S-curve characteristic with respect to phase difference $\tau$ shown in FIG. 29C.

The voltage-control oscillator 9g controls the clock frequency, based on the low-pass filter output, such that the phase difference $\tau$ becomes 0. For example, if the phase of the despreading code advances relative to the received spreading code, the clock frequency is lowered and controlled such that the phase difference becomes 0; or, if the phase of the despreading code lags relative to the received spreading code, the clock frequency is raised and controlled such that the phase difference becomes 0.

As explained above, the phase of the transmission-side spreading code train (received spreading code train) is detected with a precision of within one chip by the path search unit $2e$ (synchronization acquisition), and then synchronization tracking is performed by the DLL circuits $9_1$ to $9_3$, and the despreading code train $A_1$ synchronized with the phase of the transmission-side spreading code train is input to the finger units.

In mobile communications, the environment of either the transmitter or the receiver, or both, changes with time, and so the path search unit $2e$ must infer, from changes in the delay amounts and reception levels, that the three newly detected paths are the same as the three paths received until that time, and the RAKE receiver must use the signals from the three paths to control RAKE reception. Further, a new path with different delay may appear to be more certain than the three paths (with large reception intensities) which had initially appeared certain. In this case, path allocations must be switched. In the path allocation switching of the prior art, the multiple path signals are arranged in order of magnitude, the path with the largest multipath signal is allocated to the first finger unit $5_1$, the path with the second-largest multipath signal is allocated to the second finger unit $5_2$, and the path with the third-largest multipath signal is allocated to the third finger unit $5_3$. However, in this allocation method, if the delay of the path newly inferred to be certain is small, part of the spreading period sent via the other two paths is lost.

FIG. 30 is a diagram explaining loss of data which arises upon switching path allocations. Upon the first switching of path allocations, the correlations of five paths, a to e, obtained from the matched filter $7a$ have magnitudes in the order b>d>e>a>c. The path selection section $7c$ selects the upper three paths b, d, e, allocating path b to the first finger unit $5_1$, path d to the second finger unit $5_2$, and path e to the third finger unit $5_3$. The finger units $5_1$, $5_2$, $5_3$ execute despreading on signals arriving from the paths b, d, e at respective times $T_{11}$, $T_{12}$, $T_{13}$, delays the obtained despreading signals by time delays $d_1$, $d_2$, $d_3$ to arrange the phases, and outputs the signals.

Next, on the second switching of path allocations, the magnitudes of the correlations of the five paths a to e obtained from the matched filter $7a$ are in the order d>b>a >e>c. The path selection section $7c$ selects the upper three paths d, b, a, and assigns path d to the first finger unit $5_1$, the path b to the second finger unit $5_2$, and path a to the third finger unit $5_3$. As a result, the finger units $5_1$, $5_2$, $5_3$ execute despreading on signals incoming from the paths d, b, a at respective times $T_{21}$, $T_{22}$, $T_{23}$; the despreading signals obtained are delayed by time delays $d_1'$, $d_2'$, $d_3'$ to arrange phases, and are output. By means of the above, if there are eight symbols of valid data received via path b between the first and second path switching times, then there are 6.7 symbols of valid data received via path d, and 4.6 symbols of valid data received via path e. Consequently 1.3 symbols' worth of data is lost from path d (lost portion DF1), and 3.4 symbols' worth of data is lost from path e (lost portion DF2), compared with the maximum length of valid data (8 symbols). In these lost portions the spreading gain is reduced, and detection accuracy is degraded.

Even in cases where the three apparently certain paths do not change, if the multipath signal level (correlation) changes, path allocation switching is performed, and the above-described data losses occur. Also, depending on the reception environment and the symbol period, still more symbols may be lost, and in some cases data from all paths may be lost.

In the above path search method, finger units are allocated beginning from paths with higher reception levels. This path allocation method has the advantage of being simply executable. However, the above-described data losses occur, and moreover, even for the same three paths, depending on the multipath signal level (correlation), mutual substitution may be performed, and data losses may arise due to this substitution.

In light of the above, it is necessary that the identity of the previous paths and the present paths be accurately judged, and that, in cases where they are the same, that the allocation of finger units to these paths not be changed.

The transmission/reception clock of the base station and mobile equipment sweeps asynchronously, and there are fluctuations in the system clock of the mobile equipment. Consequently some kind of timing synchronization is needed, in order to synchronize the timing of the mobile equipment with the reference timing of the base station. Conventionally, this timing control is performed by a DLL circuit; but a DLL circuit is necessary for each path (finger), and there is the further problem that a VCO, envelope detector, various filters, and other analog circuitry is also required.

Hence an object of this invention is to accurately judge whether paths are identical, and if paths are identical, to prevent changes in the allocation of paths to fingers.

Another object of this invention is to perform synchronization to the reference timing, without using DLL circuits.

Still another object of this invention is to provide a CDMA receiver having a path follow-up function which is digitally equivalent to a DLL circuit.

DISCLOSURE OF THE INVENTION

The path search unit in a CDMA receiver comprises (1) a correlation detection section, which detects the correlation, in each prescribed time interval, between a received signal and a desired signal; (2) a path selection section, which selects a plurality of paths along which the desired signal arrives based on the peak level of the above correlation, and employs the peak detection time as the desired signal detection time; (3) a path judgment section, which, if the difference between the detection time of the desired signal arriving via a path selected this time and the previous detection time is within an allowable range, judges that the path selected this time is identical to the path previously allocated to the prescribed despreading/delay adjustment section; and (4) a path allocation section which performs path allocation, such that, if the path selected this time is identical to the previously allocated path, despreading and delay adjustment processing are performed for the desired signal arriving via the selected path by the same despreading/delay adjustment section as previously. The timing control unit comprises (1) a calculating section, which calculates the difference between the desired signal detection time this time for the above identical path and reference time, and (2) a timing control circuit, which controls the lead or lag in the timing based on the sum of the above time differences in each identical path.

By configuring the CDMA receiver in this way, if the paths already allocated to finger units (despreading/delay adjustment units) and the paths selected this time are the same, the allocation of paths to finger units is not changed, and so data loss at the time of path allocation can be prevented.

Because judgment of whether paths are identical is made depending on whether differences in detection times are within an allowable range for example time interval for one chip, the precision of estimation of path identity can be raised.

The phase of the transmission-side spreading code train can be detected by the path search unit with a precision within one chip (synchronization acquisition), and the lead/lag of the timing signal can be controlled based on the sum of differences for the detection time this time and the reference time for each identical path (synchronization tracking). As a result, even if there are fluctuations in the distance between transmitter and receiver or in the system clock, the timing of each unit can be synchronized with the reference timing of the base station, and DLL circuits can be made unnecessary. Moreover, (1) when a new path is allocated to each finger unit, the desired signal detection time for the path is taken to be the reference time; or, (2) the base station frame start time detected at the start of communication with the base station is taken to be the reference time.

The timing control circuit controls the timing lead and lag as follows.

In a first method, according to whether the detection time this time is later than or earlier than the reference time, the above time difference is changed by +1 or −1, to control the timing lead or lag based on the sum of time differences for each identical path. By this means, the hardware configuration can be made simple.

In a second method, time differences are weighted based on the magnitude of the correlation (reception level) at this time, and the timing lead or lag is controlled based on the sum of weighted time differences for each identical path. In this way, paths with high correlations can be endowed with high reliability in controlling the timing (synchronization tracking control).

In a third method, the number of paths judged to be identical paths is detected, the sum of time differences is normalized based on the number of paths, and the lead or lag of the timing is controlled based on the value obtained. By this means, timing control (synchronization tracking control) can be performed with constant sensitivity even if there are changes in the number of paths due to the electromagnetic wave environment.

In a fourth method, the sum of time differences is normalized based on the number of paths which are judged to be the same paths as the previous time, and the correlations of which are equal to or greater than a prescribed level; the timing lead or lag is controlled based on the value obtained. By this means, the electromagnetic wave environment can be further taken into account in performing timing control (synchronization tracking control) with constant sensitivity.

Specific methods of timing control are as follows. (1) control the voltage-controlled oscillator (VCO) based on the sum of time differences, in order to control the frequency of the system clock. (2) When the pulse output from a fast clock oscillator is frequency-divided to generate the system clock, pulses are inserted or removed based on the sum of time differences, to control the system clock frequency. (3) When the system clock is frequency-divided and various timing signals are generated, the frequency division ratio is controlled based on the sum of time differences in order to control the lead or lag of the timing.

BRIEF DESCRIPTION OF THE DRAWINGS

FIG. 17 is a table showing an example of normalization in terms of the number of valid paths;

FIG. 30 is a figure used to explain data loss upon switching of path allocations.

BEST MODE FOR CARRYING OUT THE INVENTION (A) Summary of this Invention

Figure 1:
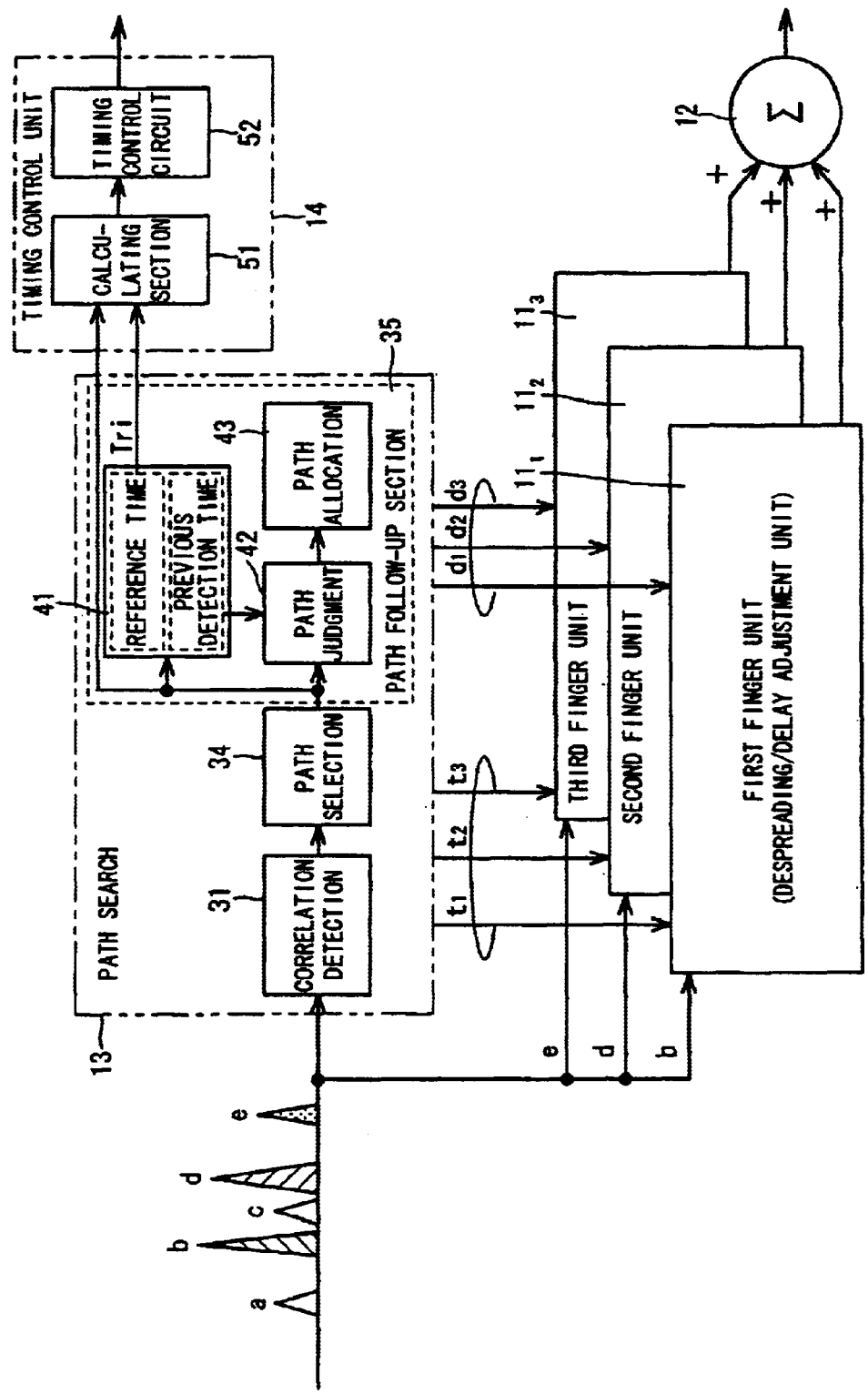
FIG. 1 is a basic schematic view of the CDMA receiver of this invention.

FIG. 1 is a basic schematic view of the CDMA receiver of this invention. In the figure, $11_1$ to $11_3$ are finger units (despreading/delay adjustment units), which perform despreading processing with timing $t_1$ to $t_3$ on three delayed desired waved b, d, e arriving via allocated paths, add delay amounts $d_1$ to $d_3$ according to the path to the despread signals obtained from despreading processing, and output the result; 12 is a combining unit which combines the outputs of the finger units; 13 is a path search unit which allocates a path to each finger unit; and 14 is a timing control unit which synchronizes the timing with a reference timing.

The path search unit 13 has a correlator 31, which detects the correlation between received signals and the desired signal; a path selection section 34, which selects a plurality of paths over which the desired signal arrives based on correlation peak levels, and takes the peak detection times to be desired signal detection times; and a path follow-up section 35 which, if a selected path is identical to a path which has been allocated to one of the finger units, causes that finger unit to continue execution of despreading/delay adjustment processing.

The path follow-up section 35 comprises (1) a detection time storage part 41, which, when a new path is allocated to each finger unit, stores the desired signal detection time of the path as the reference time Trj, and which stores the latest (previous) desired signal detection time for the path; (2) a path judgment part 42, which, if the difference between the detection time of the desired signal arriving via the path selected this time and the previous-time detection time stored by the storage part is within an allowable range, judges that the path selected this time is identical to the path previously allocated to the prescribed finger unit; and, (3) a path allocation part 43 which performs path allocation such that, if the path is the same, causes despreading and delay adjustment processing of the desired signal arriving via the selected path to be executed by the same finger unit as previously.

The timing control unit 14 comprises (1) a calculating section 51 which calculates the difference, for the same path, between the detection time for this time, and the reference time for the path, and (2) a timing control circuit 52 which controls the timing lead or lag based on the sum of time differences for the same paths.

The path follow-up section 35 prepares, as a window, a pseudo-S curve, similar to a DLL circuit, for use in judging path identity; if a timing with newly detected correlation exists in the S-curve window, the path is inferred to be the same. Specifically, judgments are made as to whether the correlation detection timing for paths allocated to any of the finger units the previous time (the previous-time desired signal detection time) ($T_0$), and the correlation detection timing for paths selected this time (the desired signal detection time for this time) ($T_1$), are within $\pm\delta$ chips ($\delta=0.5$ chip). That is, a check is performed to determine whether the equation $$T_0 - \delta < T_1 < T_0 + \delta$$

is satisfied, and if it is satisfied, the paths are inferred to be identical. If identical, the path follow-up section 35 allocates the path selected this time to the same finger unit as previously. To finger units not allocated a path based on the above path identity, the path follow-up section 35 forcibly allocates selected paths which have not been similarly allocated. Because these are paths newly identified as apparently certain, it is possible that the path timing is greatly different from previously; but paths with low reception levels are discarded, and the gain resulting from their combination is also small, so that the effect of losses is minimal.

When this allocation of paths to finger units is completed, the detection times ($T_1$) of the desired signal arriving via each path are input to each finger unit, and despreading calculations are performed.

The detection time storage part 41 stores in the above-mentioned finger units $11_1$ to $11_3$, as reference times $Tr_1$ to $Tr_3$, detection times for the desired signal for paths when the paths are newly allocated. The calculating section 51 of the timing control unit 14 calculates, for a path judged to be identical, the difference between the desired signal detection time for this time $T_1$ and the reference time stored by the part; and based on the sum of the above time differences for all paths judged to be identical, the timing control circuit 52 controls the frequency of the system clock to control the timing lead/lag.

In this way, the path search unit 13 detects the phase of the spreading code train with a precision of within 1 chip (synchronization acquisition), and then the timing control unit 14 controls the timing signal lead/lag (synchronization tracking).

(B) Path Allocation Control in this Invention

Figure 2:
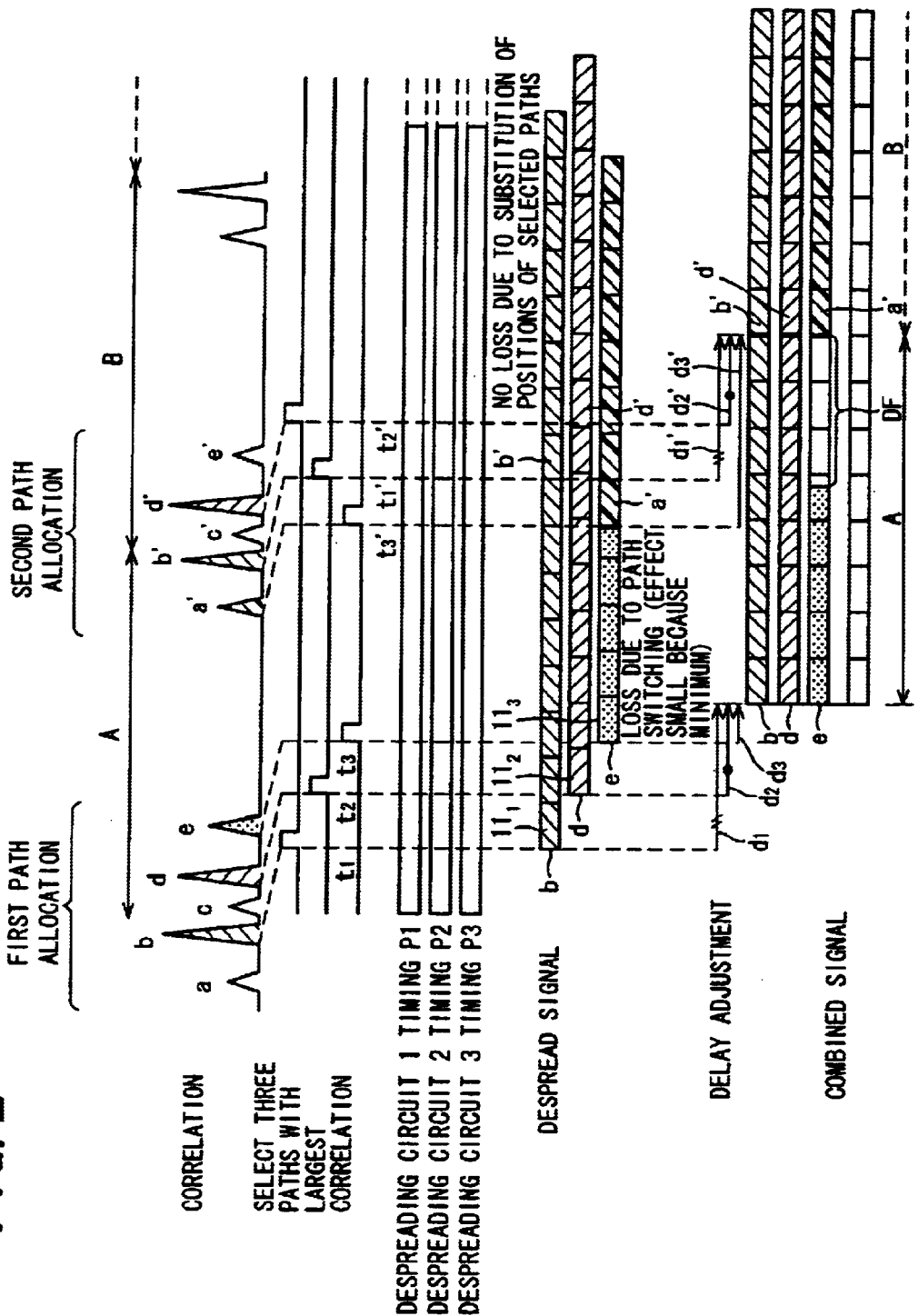
FIG. 2 is a figure explaining path allocation in this invention.

FIG. 2 is a figure explaining path allocation. At the first time for path allocation, the order of magnitudes of the correlations of the five paths a through g obtained from the correlation detection section 31 is b>d>e>c>a. The path selection section 34 selects as candidate paths a number of paths equal to the number of fingers (=3) with the greatest correlations, that is, the paths b, d, e, and outputs the respective detection times $T_1$, $T_2$, $T_3$, in the order of their correlation magnitudes, to the path follow-up section 35. In the initial period, the path follow-up section 35 stores the detection times $T_1$, $T_2$, $T_3$, and allocates candidate paths to the first through third finger units $11_1$, $11_2$, $11_3$ in the order of correlation magnitude, b, d, e. That is, initially the path follow-up section 35 allocates path b to the first finger unit $11_1$, allocates path d to the second finger unit $11_2$, and allocates path e to the third finger unit $11_3$; the despreading start timing $t_1$, to $t_3$ and time delays $d_1$ to $d_3$ are input to the respective finger units. The finger units $11_1$, $11_2$, $11_3$ execute despreading processing on signals arriving over the paths b, d, e at the times $t_1$, $t_2$, $t_3$, delay by the time delays $d_1$, $d_2$, $d_3$ the despread signals thus obtained to arrange the phases, and output the results.

At the second time for path allocation, the order of correlation magnitudes of the five paths a' to e' obtained from the correlation detection section 31 is d'>b'>a'>c'>e'. The path selection section 34 selects as candidate paths a number of paths equal to the number of fingers (=3) with the greatest correlations, that is, the paths d', b', a', and outputs the respective detection times $T_1'$, $T_2'$, $T_3'$, in the order of their correlation magnitudes, to the path follow-up section 35. The path follow-up section 35 then: (1) checks whether the differences between the detection time $T_1'$ for the candidate path d' selected this time with the largest correlation magnitude, and the detection times $T_1$ to $T_3$ stored the previous time, are within the allowable range; (2) checks whether the differences between the detection time $T_2'$ for the candidate path b' with the second-largest correlation magnitude, and the detection times $T_1$ to $T_3$ stored the previous time, are within the allowable range; and (3) finally, checks whether the differences between the detection time $T_3'$ and the detection times $T_1$ to $T_3$ stored the previous time are within the allowable range.

If, in each of (1) to (3) the differences are within the allowable range, the path follow-up section 35 judges that the path selected this time is identical to the path previously allocated to the prescribed finger unit. For example, if the difference between the detection time $T_1$ and the detection time $T_1'$, and the difference between the detection time $T_2$ and the detection time $T_2'$, are both within the allowable range, it is judged that path b and path b' are identical, and that path d and path d' are identical.

Next, the path follow-up section 35 causes the finger units for path b and path d to execute despreading and delay adjustment processing for the desired signals arriving via the path b' and path d'. That is, the path follow-up section 35 allocates path b' to the first finger unit $11_1$, allocates the path d' to the second finger unit $11_2$, and inputs to the respective finger units the despreading start timing $t_1'$, $t_2'$ and the time delays $d_1'$, $d_2'$. In this way, if the paths b, d and the paths selected this time b', d' are identical, the finger units $11_1$, $11_2$ for paths b and d are made to continue performing the despreading and delay adjustment processing for the desired signal arriving via the paths b' and d', so that data loss in the finger units $11_1$, $11_2$ upon path allocation does not occur. Also, path identity is judged according to whether the difference in detection times is within an allowable range, so that the precision of estimation of path identity can be increased.

On the other hand, the path follow-up section 35 allocates to the finger unit $11_3$, to which a path has not been allocated according to the criterion of path identity, a path a' not similarly allocated, and inputs to this finger unit $11_3$ the despreading start timing $t_3'$ and time delay $d_3'$. As a result, the finger unit $11_3$ performs despreading and delay adjustment processing for the desired signal arriving via path a', different from the previous path e. As a result, 3.4 symbols' worth of data is lost from path e (lost portion DF), and because of this loss the spreading gain is reduced; however, overall the number of data losses can be minimized, and detection precision can be improved compared with the prior art.

(C) Embodiments (a) Overall Configuration of Wireless Equipment

Figure 3:
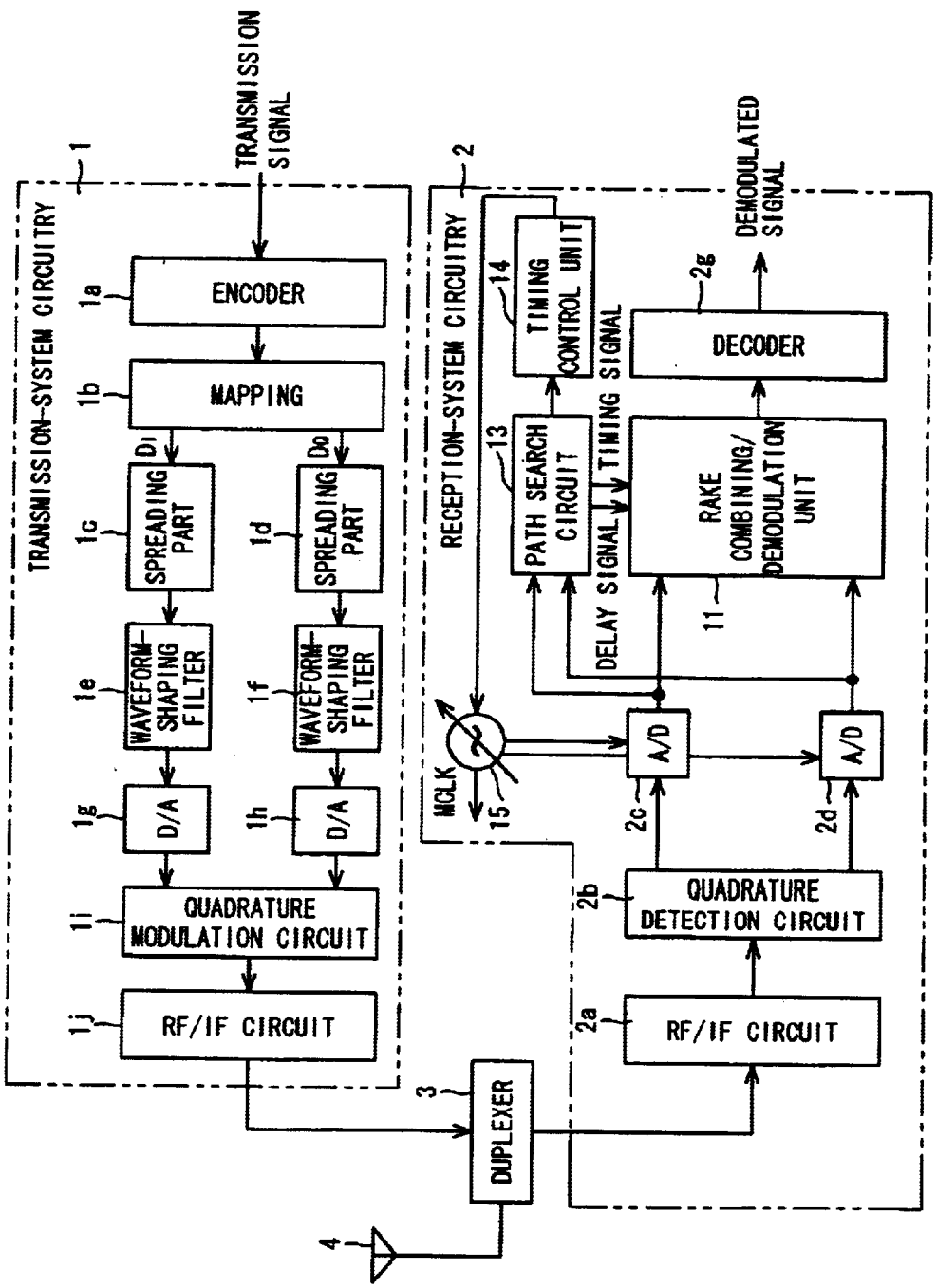
FIG. 3 is an overall schematic view of wireless equipment comprising the CDMA receiver of this invention.
Figure 23:
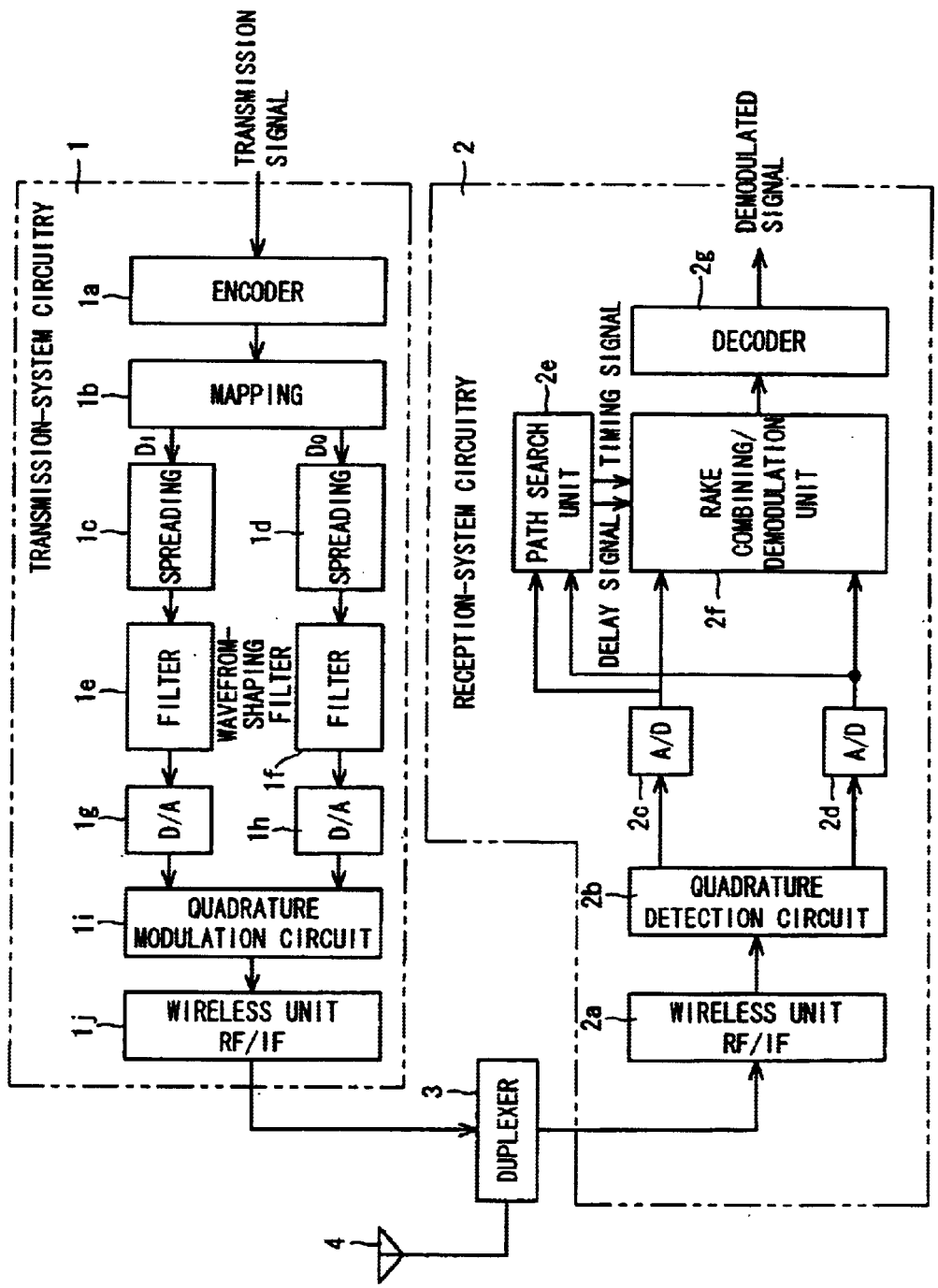
FIG. 23 is a schematic view of conventional CDMA wireless equipment.
Figure 24:
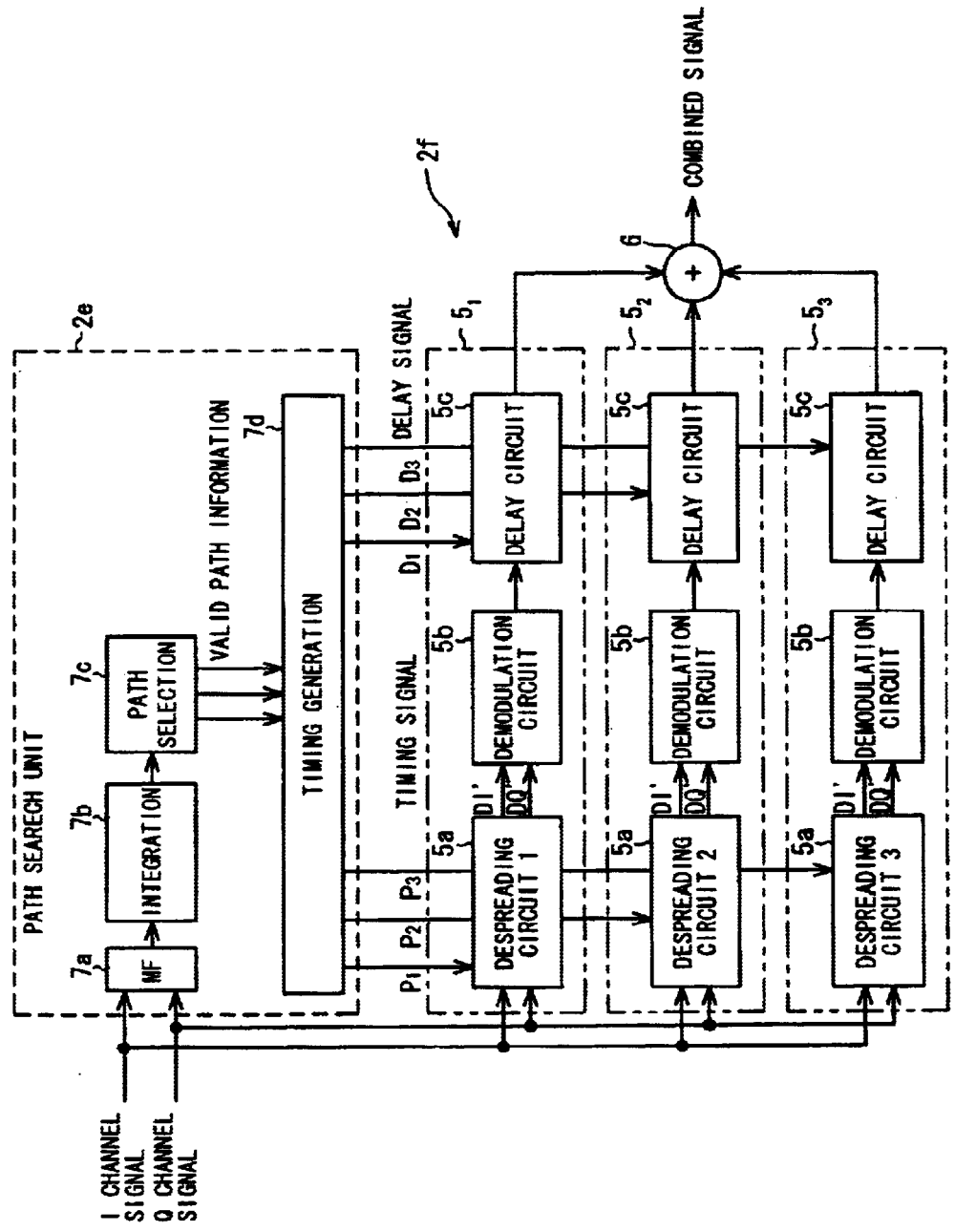
FIG. 24 is a schematic view of a conventional path search and RAKE combining/demodulation unit.
Figure 25:
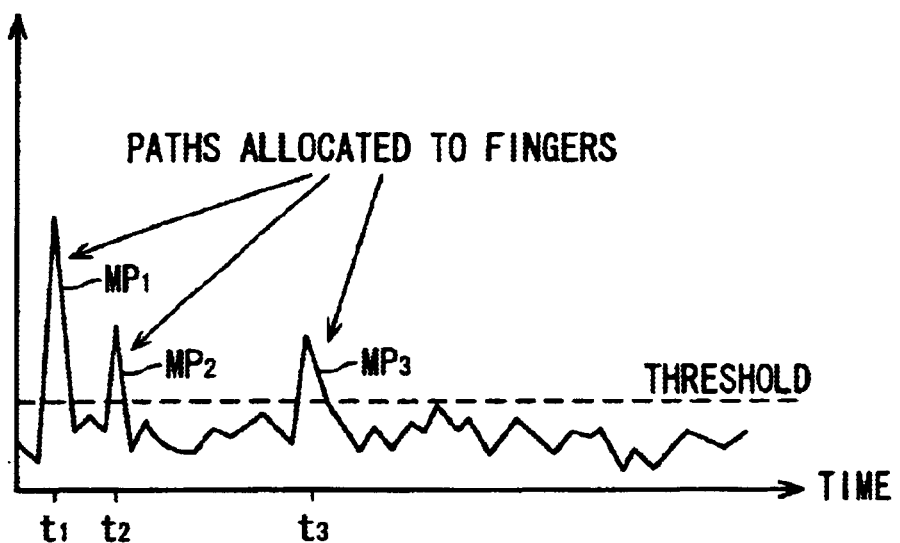
FIG. 25 is a figure used to explain path searching by the path search unit.
Figure 26:
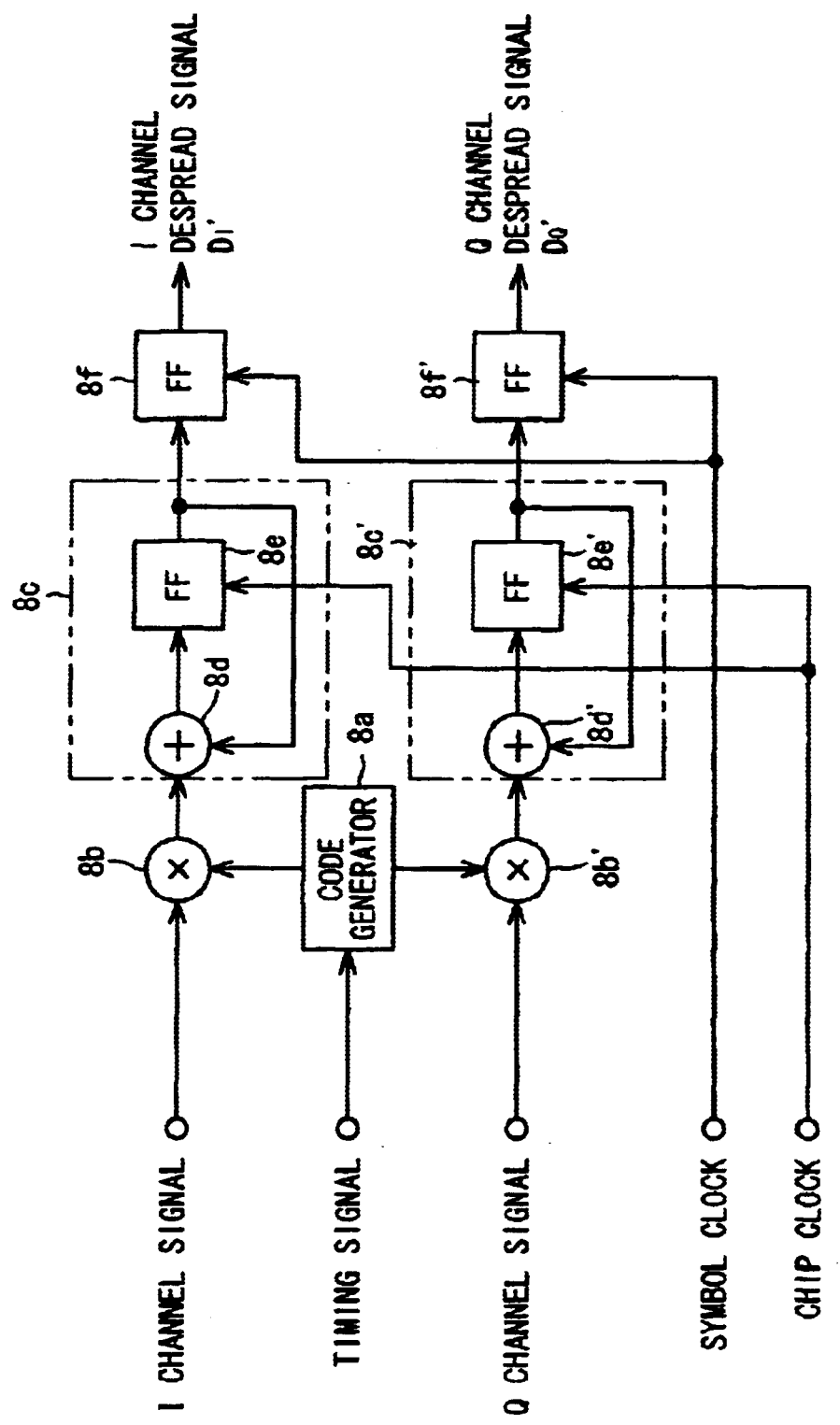
FIG. 26 is an example of a despreading circuit.
Figure 27:
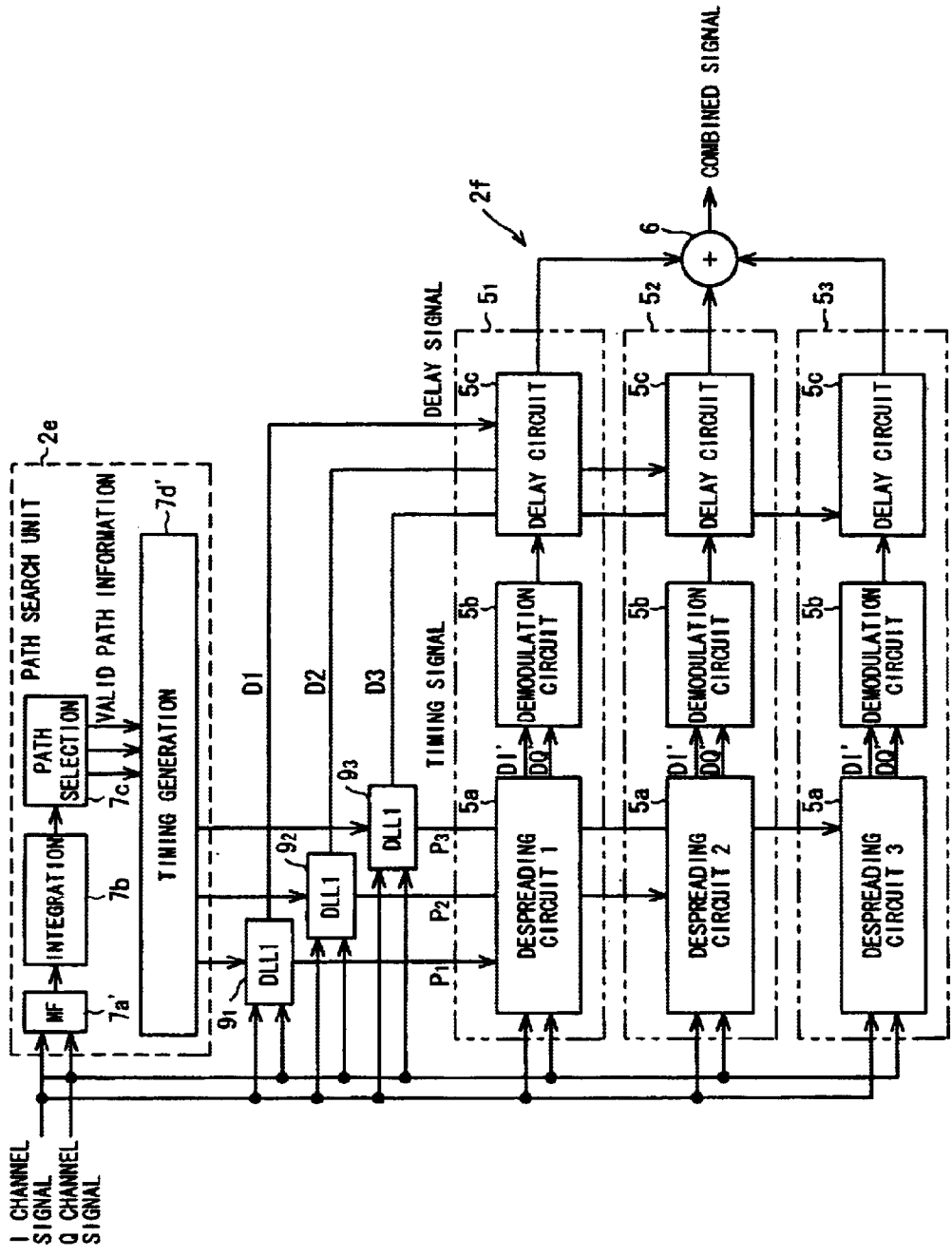
FIG. 27 is a schematic view of a path search unit and RAKE combining unit, comprising a DLL.
Figure 28:
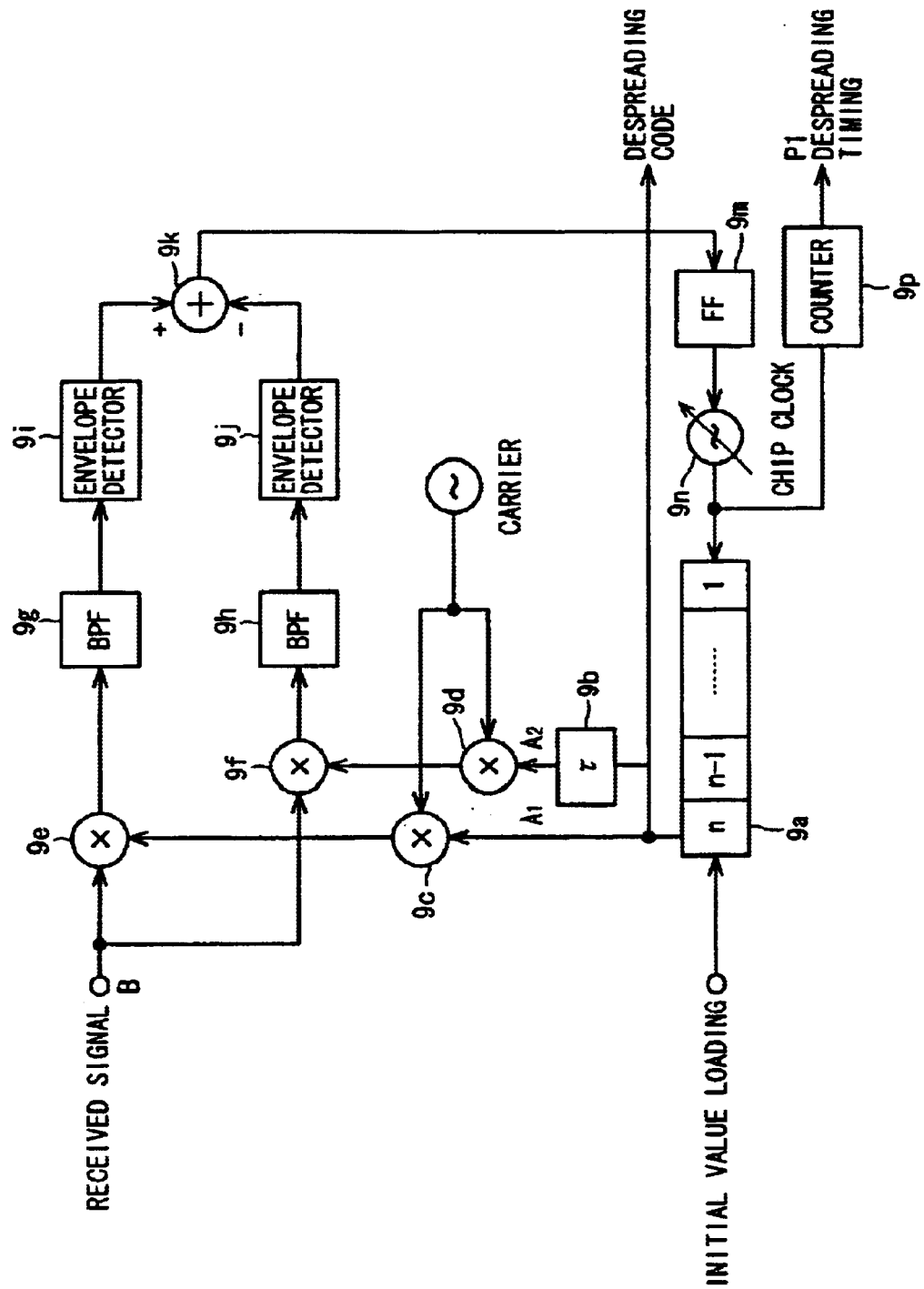
FIG. 28 is a schematic view of a DLL circuit.
Figure 29A:
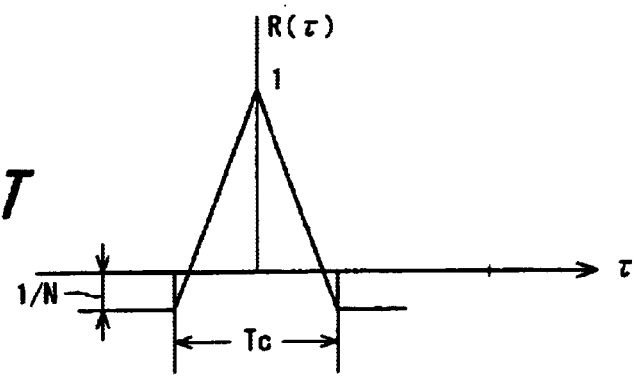
FIG. 29A to FIG. 29C are figures used to explain a DLL S curve.
Figure 29B:
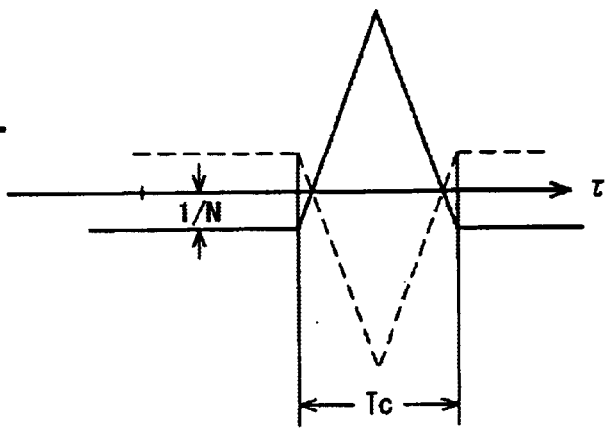
Figure 29C:
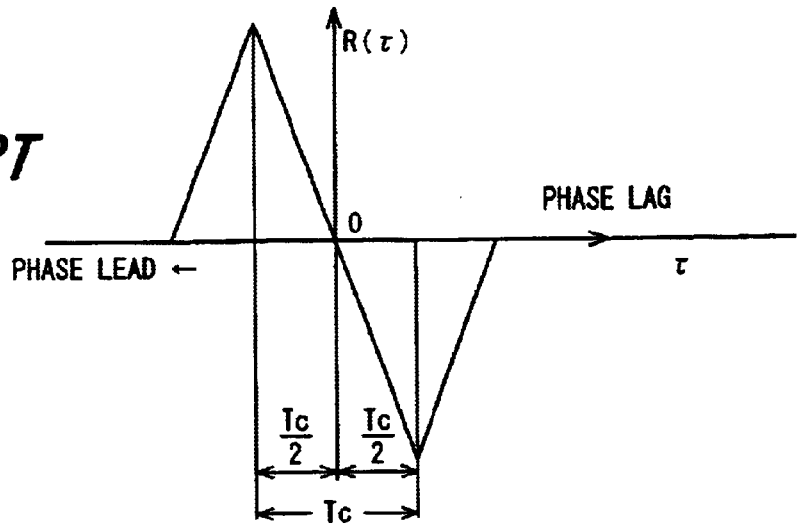

FIG. 3 is an overall schematic view of wireless equipment comprising the CDMA receiver of this invention; parts which are the same as in FIG. 23 are assigned the same symbols. 1 is the transmission-system circuitry, 2 is the reception-system circuitry, 3 is a duplexer which sends transmission signals to the antenna and inputs reception signals to the reception-system circuitry, and 4 is an antenna. In the transmission-system circuitry 1, 1a is an encoder which encodes the transmission signal (transmission data), and 1b is a mapping unit, for example, dividing frame data (pilot signal and transmission data), alternating for each bit, into same-phase component (I or in-phase component) data and quadrature component (Q or quadrature component) data, that is, the two series, I symbol data $D_I$ and Q symbol data $D_Q$. 1c and 1d are spreaders which execute spreading modulation of the I symbol data and Q symbol data $D_I$, $D_Q$ using a prescribed spreading code; 1e, 1f are waveform-shaping filters; 1g, 1h are D/A converters which perform D/A conversion of the outputs of the filters 1e, 1f; 1i is a quadrature modulation circuit which executes QPSK quadrature modulation of the I channel signal and Q channel signal and outputs the result; and 1j is a wireless unit which performs frequency conversion to IF or RF, and performs high-frequency amplification and other functions.

In the reception-system circuitry 2, 2a is a wireless unit which performs frequency conversion to IF or RF, and performs high-frequency amplification and other functions; 2b is a quadrature detection circuit which uses orthogonal detection to demodulate the I channel and Q channel signals; 2c and 2d are A/D converters which convert the I channel and Q channel signals into digital data; and 2g is a decoder. 11 is a RAKE combining/demodulation unit, comprising a plurality of finger units $11_1$, to $11_3$ (FIG. 1). 13 is a path search unit which searches for paths and allocates the paths to finger units; 14 is a timing control unit for synchronization with a reference timing; and 15 is a clock generation unit which uses the timing control unit to control the frequency of the clock MCLK.

(b) CDMA Receiver of this Invention

Figure 4:
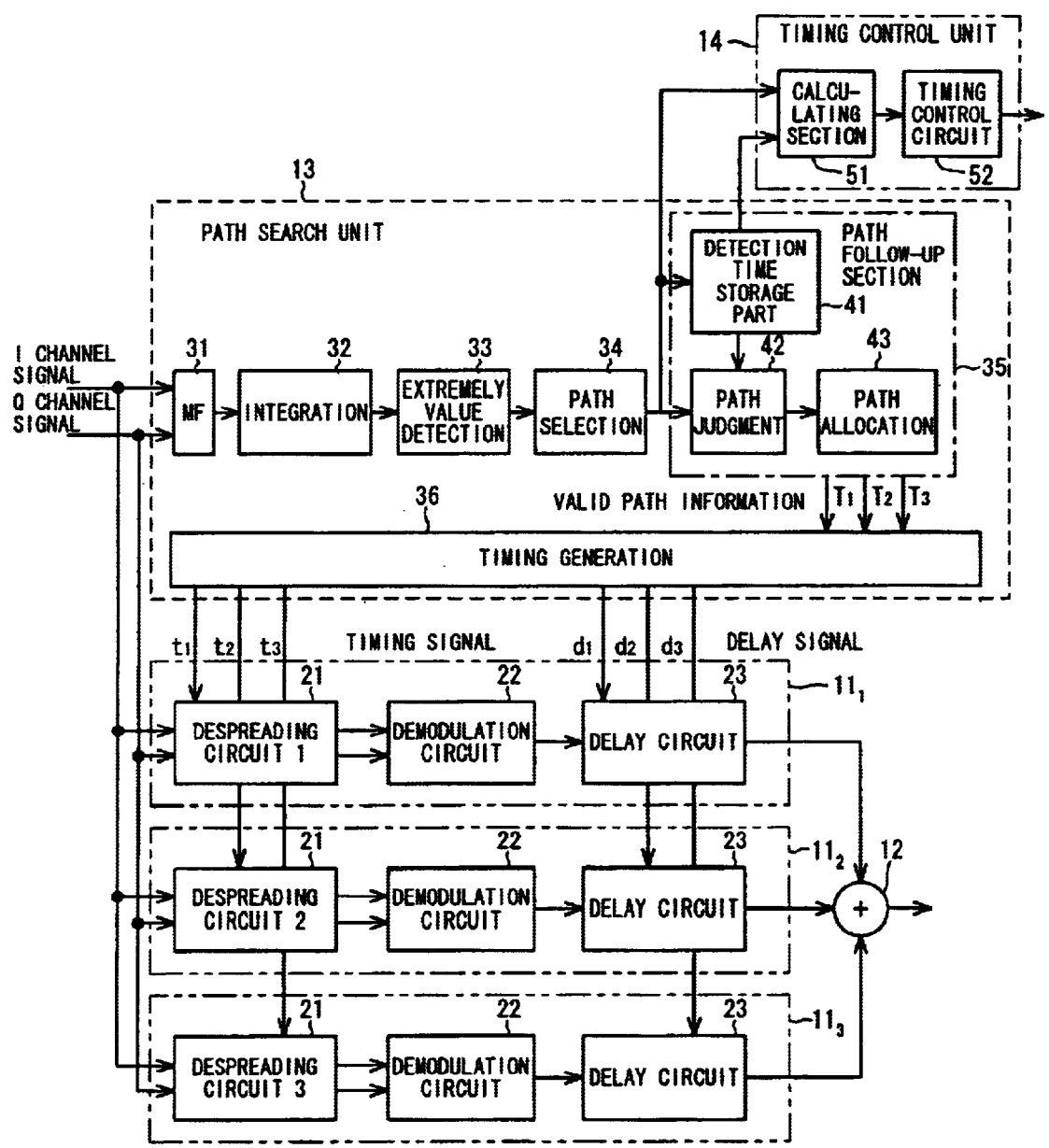
FIG. 4 is a schematic view of the principal components of the CDMA receiver of this invention.

FIG. 4 is a schematic view of the principal components of the CDMA receiver of this invention.

$11_1$ to $11_3$ are each finger units (despreading/delay adjustment units), which perform despreading processing based on the timing $t_1$ to $t_3$ specified for the desired signal arriving via the allocated paths, then add a delay $d_1$ to $d_3$, according to the path, to the despread signal obtained by despreading processing, and output the results. 12 is a combining unit which combines the outputs of the finger units; 13 is a path search unit which allocates a path to each finger unit; and 14 is a timing control unit which synchronizes the timing with a reference timing.

Each of the finger units $11_1$ to $11_3$ is of the same configuration, having a despreading circuit 21, demodulation circuit 22, and delay circuit 23. Each of the despreading circuits 21 performs despreading processing on the received I channel and Q channel signals using the spreading code for that channel, with the despreading timing ($t_1$ to $t_3$) specified by the path search unit 13. The demodulation circuit 22 uses the I symbol data $D_I$ and Q symbol data $D_Q$ obtained from despreading to demodulate the original data, and the delay circuit 23 delays the output by a time ($d_1$ to $d_3$) specified by the path search unit 13. As a result, each of the finger units $11_1$ to $11_3$ performs despreading with the same timing as the spreading codes of the transmitter, adjusts the delay time according to the path, arranges the phases and inputs the signals to a RAKE combining unit 12; the RAKE combining unit 12 combines and outputs the input signals.

The path search unit 13 has a matched filter (MF) 31 which performs correlation detection, an integration circuit 32 which integrates and outputs correlations, an extreme value detection section 33, a path selection section 34, a path follow-up section 35, and a timing generation section 36.

The matched filter 31 uses the spreading code for its own channel to extract and output the signal component (desired signal) of its own channel from the antenna reception signal. Here the correlations I, Q of the I channel signal and Q channel signal are obtained independently, so that for example the calculation $(I+jQ)(I-jQ)=I^2+Q^2$ is calculated to obtain the power, which is output. The integration circuit 32 takes the time average of the matched filter output in order to remedy the loss due to momentary level drops caused by fading. The extreme value detection section 33 detects and outputs the peak of the integrated correlation value. The path selection section 34 selects the paths over which the desired signal arrives, in the number of finger units, an in order based on peak values and in magnitude order, and also outputs the detection times of the desired signal arriving on those paths. If there exists a plurality of peaks within a one-chip range, the peak detection unit 33 detects and outputs the largest of these peaks.

Figure 5:
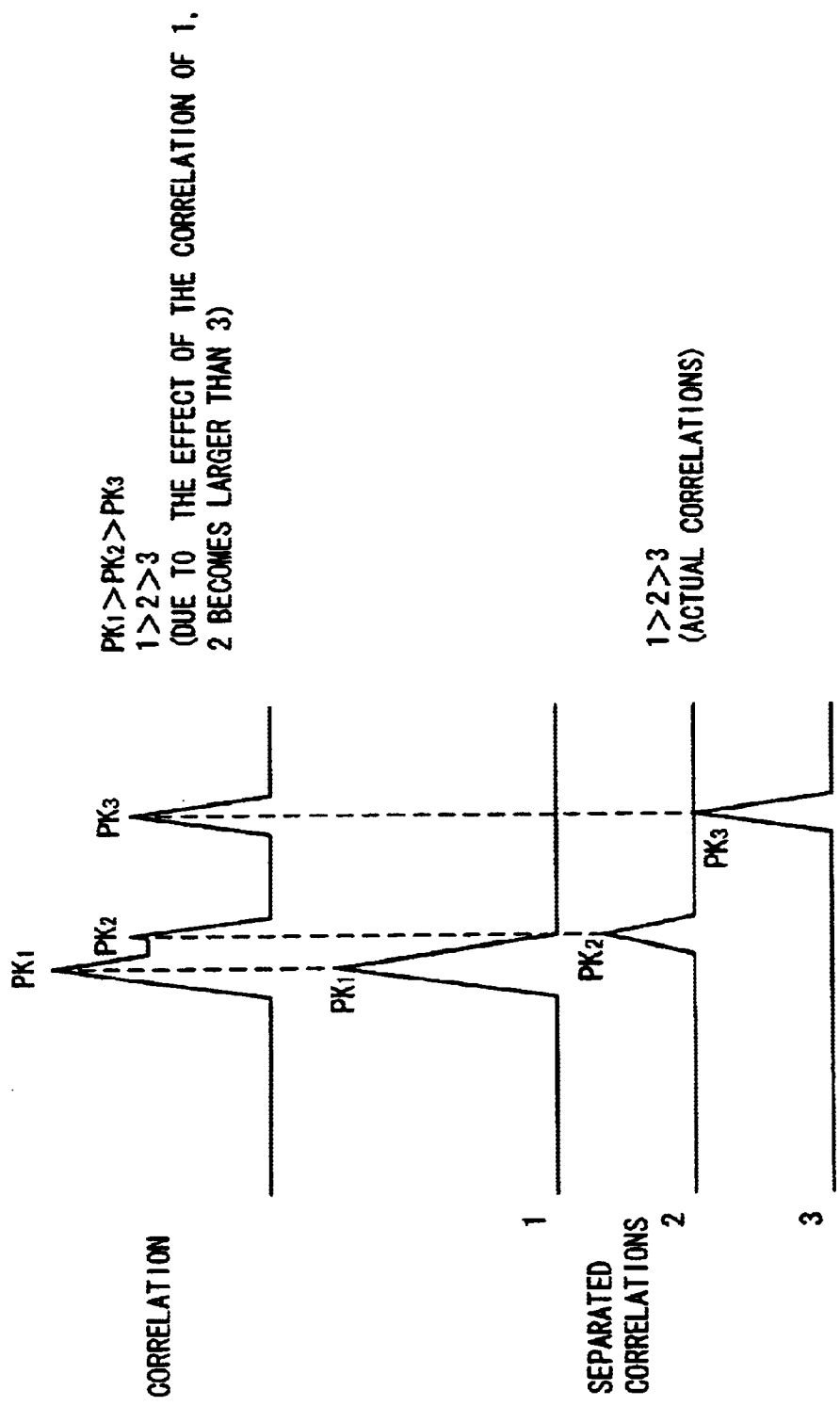
FIG. 5 is a figure explaining peak detection operation.

Because a significant correlation appears within approximately 1 chip in both directions in the spreading code, if a different delay path exists within this range, the combined correlations are output from the correlator (cf. FIG. 5). When there exist a plurality of peaks $PK_1$, $PK_2$ within the 1-chip range in this combined correlation, though it is valid to allocate the largest peak $PK_1$ to a finger unit, it is not possible to judge from the correlation alone whether a peak smaller than this $PK_2$ is more valid than combining another peak $PK_3$ with a greater delay difference. This is because in actuality, as shown in FIG. 5, the peak $PK_2$ is smaller than the peak $PK_3$, but may appear to be larger than $PK_3$ due to the influence of the peak $PK_1$. Also, because there is also a correlation within noise within the one-chip range, the noise component is not cancelled upon RAKE combination, and the expected gain is not obtained. Hence the extreme value detection section 33 adopts only the peak $PK_1$ with maximum value in this one-chip range as a path candidate, and excludes peak $PK_2$, which is not maximum, from path selection.

The path follow-up section 35 comprises a detection time storage part 41, path judgment part 42, and path allocation part 43. The detection time storage part 41 stores as the reference time the desired signal detection time when a new path is allocated to a finger unit, and stores the most recent (previous-time) desired signal detection time for the path. The path judgment part 42 judges, on the basis of desired signal detection times, whether a path selected by the path selection section 34 is identical to one of the paths selected until then. The path allocation part 43 performs the following. (1) If the result of judgment is that one path is identical, the path allocation part 43 allocates execution of despreading and delay adjustment processing of the desired signal arriving over the path selected this time to the same finger unit as previously. That is, if a path is the same as previously, the same finger unit is made to continue execution of despreading/delay adjustment processing. Also, (2) the path allocation part 43 forces allocation of paths selected in reception level order to finger units to which a path has not been allocated on the basis of path identity.

The timing generation section 36 generates despreading start timing data $t_1$ to $t_3$ and delay time data $d_1$ to $d_3$ for each of the finger units according to the detection times $T_1$ to $T_3$ of paths allocated to each finger unit $11_1$ to $11_3$, and inputs this data to the respective finger units $11_1$ to $11_3$.

(c) Path Search Unit
(1) Integration Circuit

Figure 6:
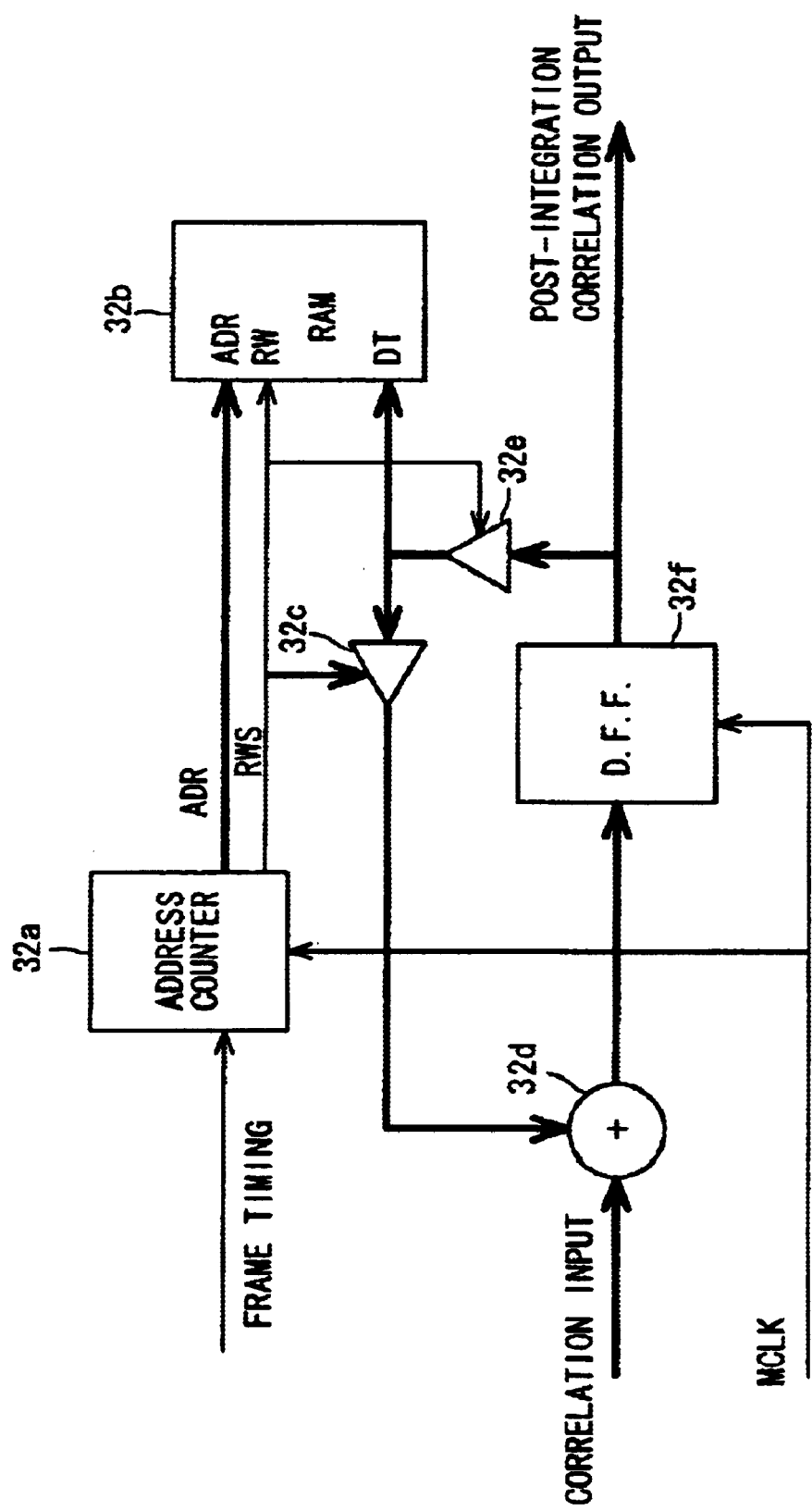
FIG. 6 is a schematic view of the integration circuit.

FIG. 6 is a schematic view of the integration circuit 32; the time-average of the correlation at each sampling time of n frames' worth is calculated and output. The address counter 32a resets the address through the frame timing, and then the address ADR is advanced each time a master clock pulse MCLK is generated, and at each clock pulse a read cycle/write cycle signal RWS is output. The RAM 32b integrates and stores the correlation sampled at each master clock pulse MCLK at each sampling time; if a single frame comprises N master clock pulses, N correlation integration values are stored. During a read cycle, the RAM 32b inputs to the adder 32d, via the buffer 32c, the correlation integration value indicated by the address ADR, and during a write cycle stores the addition result (integrated correlation value) via the buffer 32e. The adder 32d adds the correlation value input and the integrated correlation value (RAM output) at each master clock pulse, storing the result in the register 32f; the register 32f inputs the addition result to RAM 32b via the buffer 32e during the write cycle, stored at the prescribed address.

(2) Extreme Value Detection Section

Figure 7:
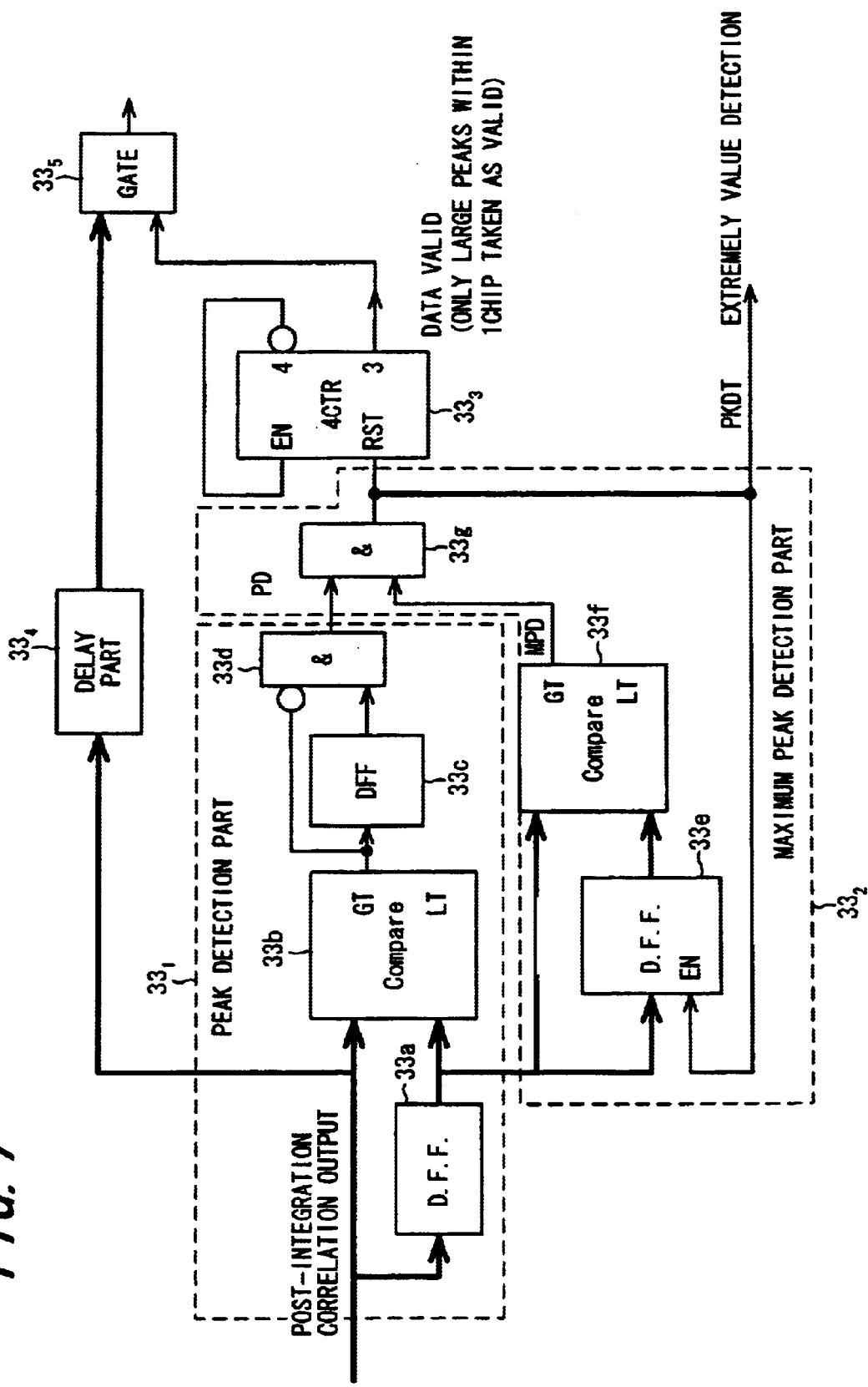
FIG. 7 is a schematic view of the extreme value detection section.

FIG. 7 is a schematic view of the extreme value detection section 33.

The extreme value detection section 33 takes as a candidate for path selection only the peak which is the maximum within a 1-chip range; peaks which are not the maximum are masked and excluded from path selection. The extreme value detection section 33 operates at a frequency four times the chipping rate (four samplings/chip), and has a peak detection part 331, a maximum peak detection part $33_2$, a base-4 counter (timer) $33_3$, a delay part $33_4$ which delays the integrated correlation by one chip interval, and a gate circuit $33_5$ which, which there exist a plurality of peaks within a one-chip range, outputs only the maximum peak.

In the peak detection part 331, the storage element 33a stores the integrated correlation; the comparator 33b compares the sampled value (integrated correlation) this time and the previous sampled value, and outputs a high-level signal if the sampled value this time is larger; the D-type flip-flop 33c stores the comparator output; and the AND gate 33d outputs a peak detection signal PD when there is a change from increase to decrease. In the maximum peak detection part $33_2$, 33e is a storage element which stores the maximum peak within one chip; the comparator 33f compares the magnitudes of the maximum peak up till then and the detected peak, and if the current peak is larger, outputs a maximum peak detection signal MPD; and the AND gate 33g outputs an extreme value detection signal PKDT when a maximum peak detection signal MPD occurs, and stores the value stored in the storage element 33a in the storage element 33e as the maximum peak value. The base-4 counter $33_3$ is reset each time a maximum peak is detected, and if a new maximum peak is not detected during the next one-chip interval (the range having correlation), outputs a data valid signal DTE with the timing of the count value 3, for input to the gate circuit $33_5$ and storage part 33e.

The gate circuit $33_5$ opens with the timing of the data valid signal DTE. At this time, the integrated correlation delayed by a one-chip interval by the delay part $33_4$ is input to the gate circuit, and so the gate circuit $33_5$ outputs the maximum peak. That is, if there exists a plurality of peaks within a one-chip range, the gate circuit outputs only the maximum peak, and masks all other peaks. As a result, the latter-stage path selection section 34 uses only the maximum peak in a one-chip interval to perform path selection control. That is, only the peak which takes a maximum in the one-chip range is adopted as a candidate for path selection, and peaks that are not the maximum are excluded from path selection. The storage part 33e is reset by the data valid signal DTE.

(3) Path Selection Section

Figure 8:
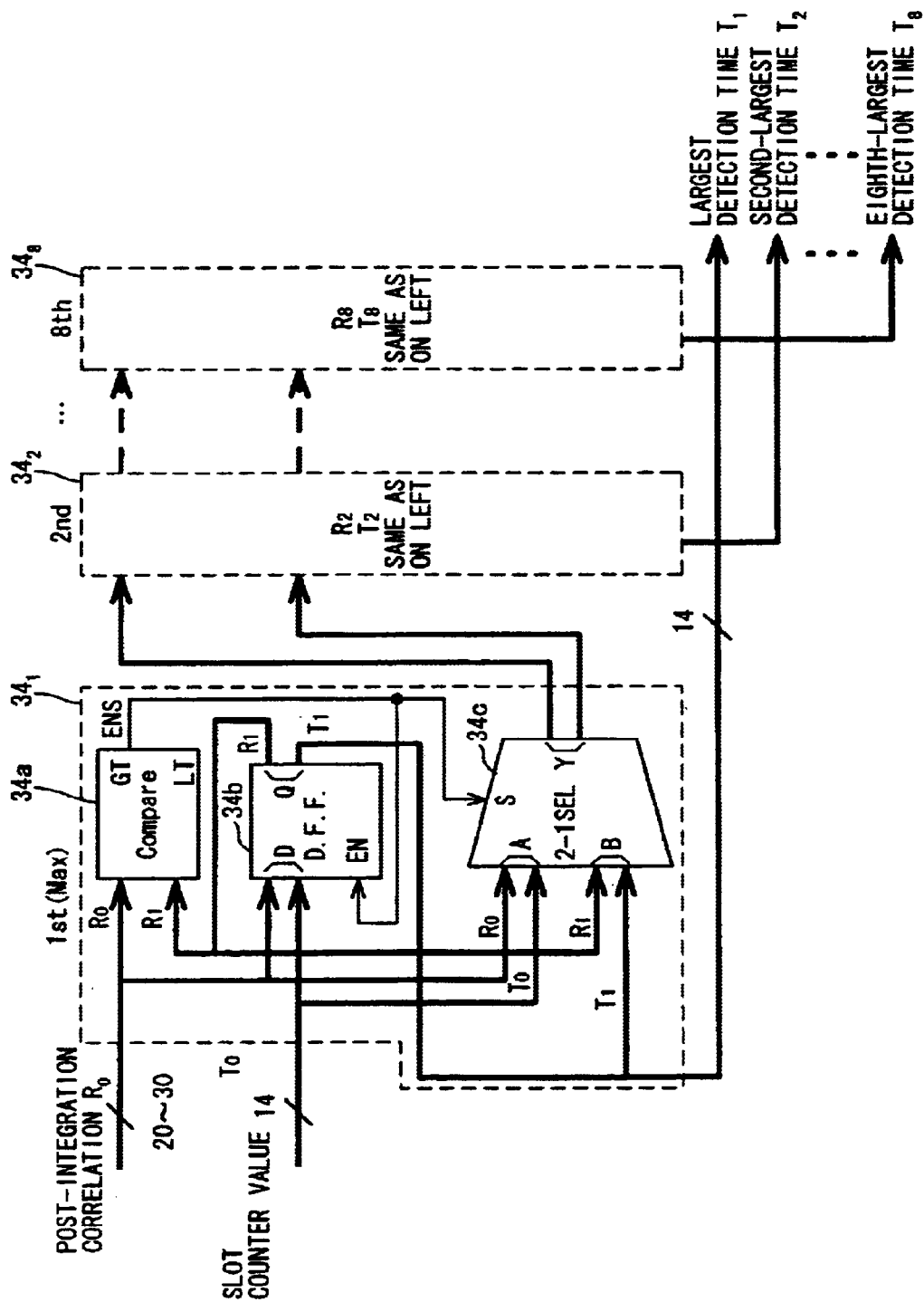
FIG. 8 is a schematic view of the path selection section.

FIG. 8 is a schematic view of the path selection section. The integrated correlation $R_0$ and its correlation detection time (slot counter value) $T_0$ are input from the extreme value detection section 33, and the path selection section selects eight correlations $R_1$ to $R_8$, starting with the largest, and their detection times $T_1$ to $T_0$. The selection of eight correlations assumes that there exist eight finger units. The slot counter value is the count value of the address counter 32a in the integration circuit of FIG. 6.

In FIG. 8, $34_1$ to $34_8$ are circuits for storage of the first- to eighth-largest integrated correlations $R_1$ to $R_8$ and their detection times $T_1$ to $T_8$; all have the same configuration, comprising a comparator 34a, register 34b with a D-type flip-flop configuration, and selector 34c. The comparator 34a compares the input integrated correlation $R_{i-1}$ (i=1 to 8) and the integrated correlation $R_i$ (i=1 to 8) stored in the register 34b; if $R_{i-1} > R_1$, a high-level enable signal ENS is output. If $R_{i-1} > R_i$, the selector 34c selects the integrated correlation $R_i$ stored in the register 34b and the detection time $T_1$ for output to the next stage; if $R_{i-1} \leq R_1$, the input integrated correlation $R_{i-1}$ and detection time $T_{1-1}$ are selected for output to the next stage. If $R_{1-1} > R_i$, the register 34b stores anew the input integrated correlation $R_{i-1}$ and the detection time $T_{i-1}$; if $R_{i-1 \leq Ri}$, the stored contents do not change. By the above means, the path selection section 34 stores, in the registers 34b of the circuits $34_1$ to $34_8$, the eight correlations $R_1$ to $R_8$, starting from the largest, and their detection times $T_1$ to $T_8$, and outputs the detection times $T_1$ to $T_8$ to the path follow-up section 35 of the next stage.

(4) Path Follow-Up Section

Figure 9:
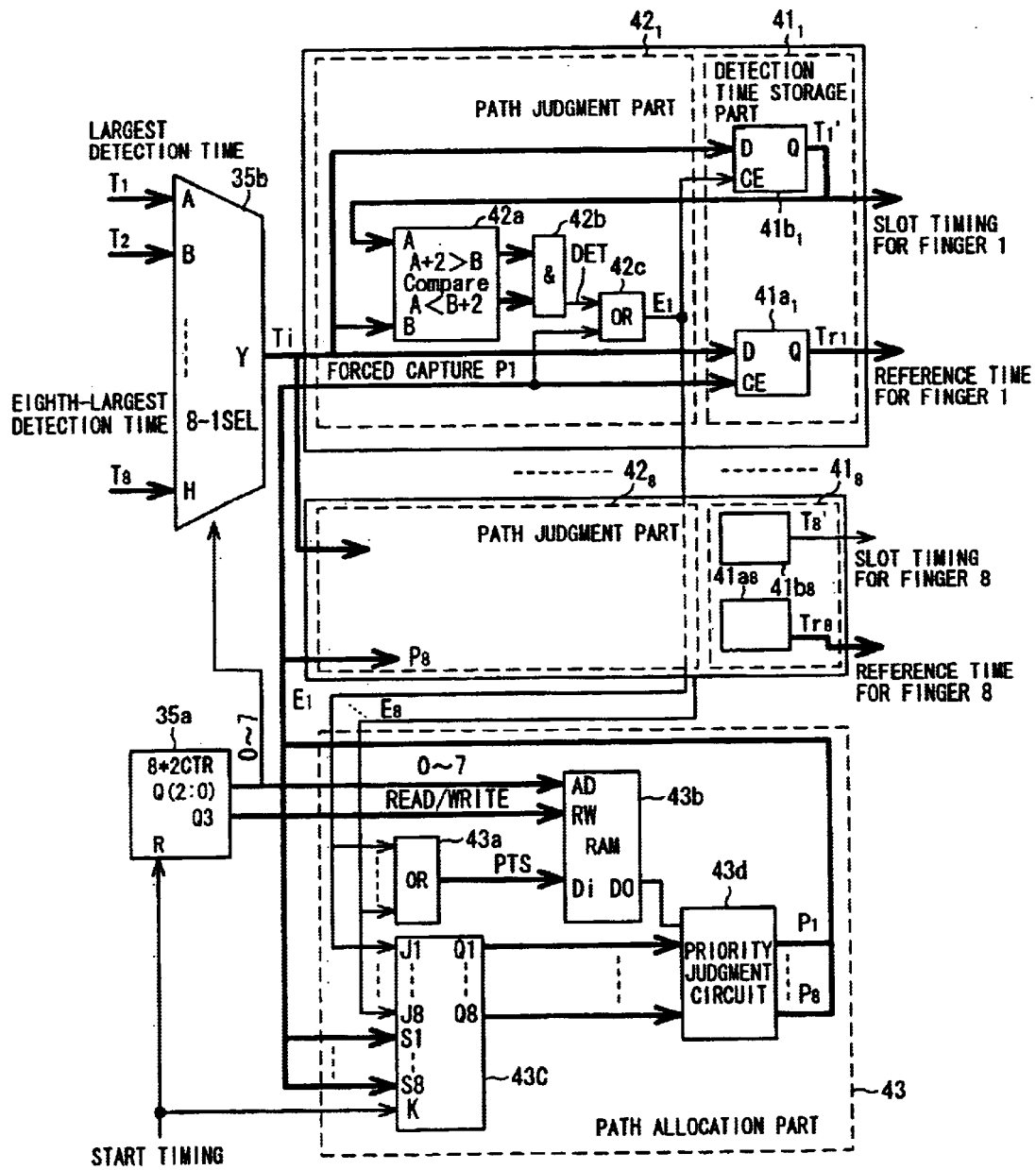
FIG. 9 is a schematic view of the path follow-up section.
Figure 10:
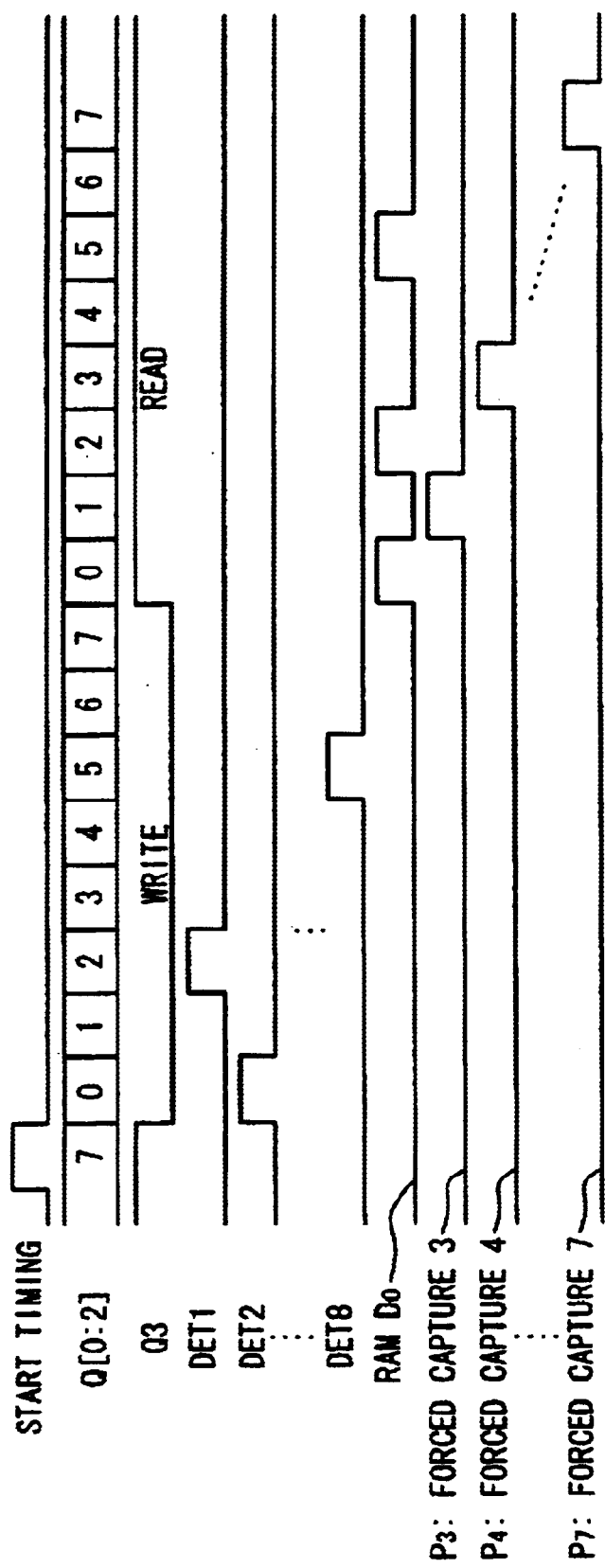
FIG. 10 is a timing chart used to explain the operation of the path follow-up section.

FIG. 9 is a schematic view of the path follow-up section, and FIG. 10 is a timing chart used to explain the operation of the path follow-up section. 35a is a base-8*2 counter, comprising a base-8 counter counting from 0 to 7, and a base-2 counter which counts the overflow pulses of the base-8 counter and outputs write/read signals. 35b is a selector which selects and outputs in order the first through eighth detection time $T_1$ to $T_8$ based on the count value 0 to 7 during writing (when paths are judged to be identical) and reading (upon forced path allocation); $41_1$ to $41_8$ are detection time storage parts corresponding to the first through eighth finger units; $42_1$, to $42_8$ are path identity judgment parts, provided to correspond to the first through eighth finger units, which judge whether the path this time is identical to the path selected previously; and 43 is a path allocation part which forcibly allocates a path to a finger unit to which a path has not been allocated on the basis of path identity.

(4-1) Detection Time Storage Parts

The detection time storage parts $41_1$ to $41_8$ comprise reference time storage elements $41a_1$ to $41a_8$ which store, as the reference times Trj (j=1 to 8), the detection time for the desired signal on the path when a new path is forcibly allocated to a finger unit, and previous-time detection time storage elements $41b_1$ to $41b_8$ which store the most recent (previous-time) desired signal detection times Tj' (j=1 to 8) for the path.

(4-2) Path Identity Judgment Parts

The first to eighth path identity judgment parts $42_1$ to $42_8$ are of the same configuration, having a comparator 42a which compares the detection timing this time Ti output from the selector 35b and the detection timing for the previous time Tj', and checks whether the equation $$Tj'-\delta<Ti<Tj'+\delta \text{ (j=1 to 8)} \qquad (1)$$

is satisfied; an AND gate 42b; and an OR gate 42c which outputs an enable signal Ei (i=1 to 8) (1) when the above equation is satisfied (DETj="1"), and (2) when a forced capture pulse Pj (j=1 to 8), described below, occurs. In equation (1), δ is 0.5 chip, and because there are four samplings in one chip, δ=2.

During writing (when paths are judged to be identical), the selector 35b outputs the ith detected time Ti according to the count value i, and the comparators 42a and AND gates 42b of each of the path identity judgment parts $42_1$ to $42_8$ check whether equation (1) is satisfied. If the above equation is satisfied, the path for the detection time Ti and the path which had been allocated to the jth finger unit are inferred to be identical. For example, if the ith detection time Ti for this time satisfies equation (1) (j=1) in the first path identity judgment part $42_1$, then the first path identity judgment part $42_1$ stores the detection time Ti in the storage element $41b_1$. Also, the first path identity judgment part $42_1$ inputs to the timing generation circuit 36 (FIG. 4) the detection time Ti as the detection timing of the path allocated to the first finger unit.

(4-3) Path Allocation Part

The path allocation part 43 has an OR gate 43a, RAM 43b, a path allocation finger storage element 43c, and priority judgment circuit 43d. The OR gate 43a calculates and outputs the logical sum of the enable signals $E_1$ to $E_8$ output from the first to eighth path identity judgment parts $42_1$ to $42_8$. That is, when a path is judged identical in path identity judgment, the OR gate 43a outputs a high-level signal PTS.

The RAM 43b writes the OR gate output ("1" or "0") to the address indicated by the count value 0 to 7 of the counter 35a when writing is enabled (when paths are judged to be identical), nad reads data from the RAM address indicated by the count value 0 to 7 of the counter 35a when reading is enabled (on forcible path allocation). That is, the RAM 43b has a storage area corresponding to the first through eighth detection times $T_1$ to $T_8$, and writes "1" to the storage area corresponding to the detection time when a path is judged to be identical, and outputs in sequence the storage contents from each storage area upon forced path allocation.

The path allocation finger storage element 43c has storage areas corresponding to the first through eighth finger units, and stores "1" in the storage area corresponding to a finger unit to which a path has been allocated. That is, when a path is allocated to the ith finger unit as a result of path identity judgment, a high-level enable signal Ei is output, and so "1" is stored in the storage area corresponding to the ith finger unit. When a path is allocated to the jth finger unit through forced path allocation, a high-level enable signal Ej is output, and so "1" is stored in the storage area corresponding to the jth finger unit.

The priority judgment circuit 43d forcibly allocates, to finger units to which a path has not been allocated, paths not allocated on the basis of a path identity judgment. That is, detection times (path) not yet allocated are discriminated based on the contents stored in RAM 43b, finger units to which a path has not been allocated are discriminated based on the contents stored in the storage element 43c, and times (paths) not allocated to finger units are allocated.

During reading (forced path allocation), the priority judgment circuit 43d references the stored contents in RAM 43b indicated by the count value i of the counter 35a, and checks whether the path corresponding to the ith detection time Ti has been allocated to one of the finger units by means of path identity judgment. If not allocated, the storage element 43c is referenced, and the lowest-numbered finger unit to which a path has not been allocated is determined. If the jth finger unit has not been allocated a path, the priority judgment circuit 43d outputs a forced capture signal Pj to the jth path identity judgment part 42j corresponding to the jth finger unit, to allocate the path. In parallel with the above, the selector 35b outputs the ith detection time Ti corresponding to the count value i.

As a result, the storage element 41aj of the jth path identity judgment part 42j stores the detection time Ti as the first desired signal detection time (reference time) Trj when a new path is allocated to the jth finger unit. An enable signal Ej is generated from the OR gate 42c of the jth path identity judgment part, so that the storage element 41bj stores the detection time Ti as the most recent desired signal detection time Tj' for the path, and also inputs the detection time to the timing generation circuit 36 (FIG. 4). Further, by means of the high-level enable signal Ej, the path allocation finger storage element 43c stores "1" in the storage area corresponding to the jth finger unit. Subsequently, similar processing is performed to execute forced path allocation.

FIG. 10 is a timing chart for the case in which, when paths are judged to be identical in the order: second path judgment part $42_2$ (DET2="1") → first path judgment part $42_1$ (DET1="1") → eighth path judgment part $42_8$ (DET8="1"), paths are forcibly allocated to the third through the seventh finger units.

(5) Timing Generation Section

Figure 11:
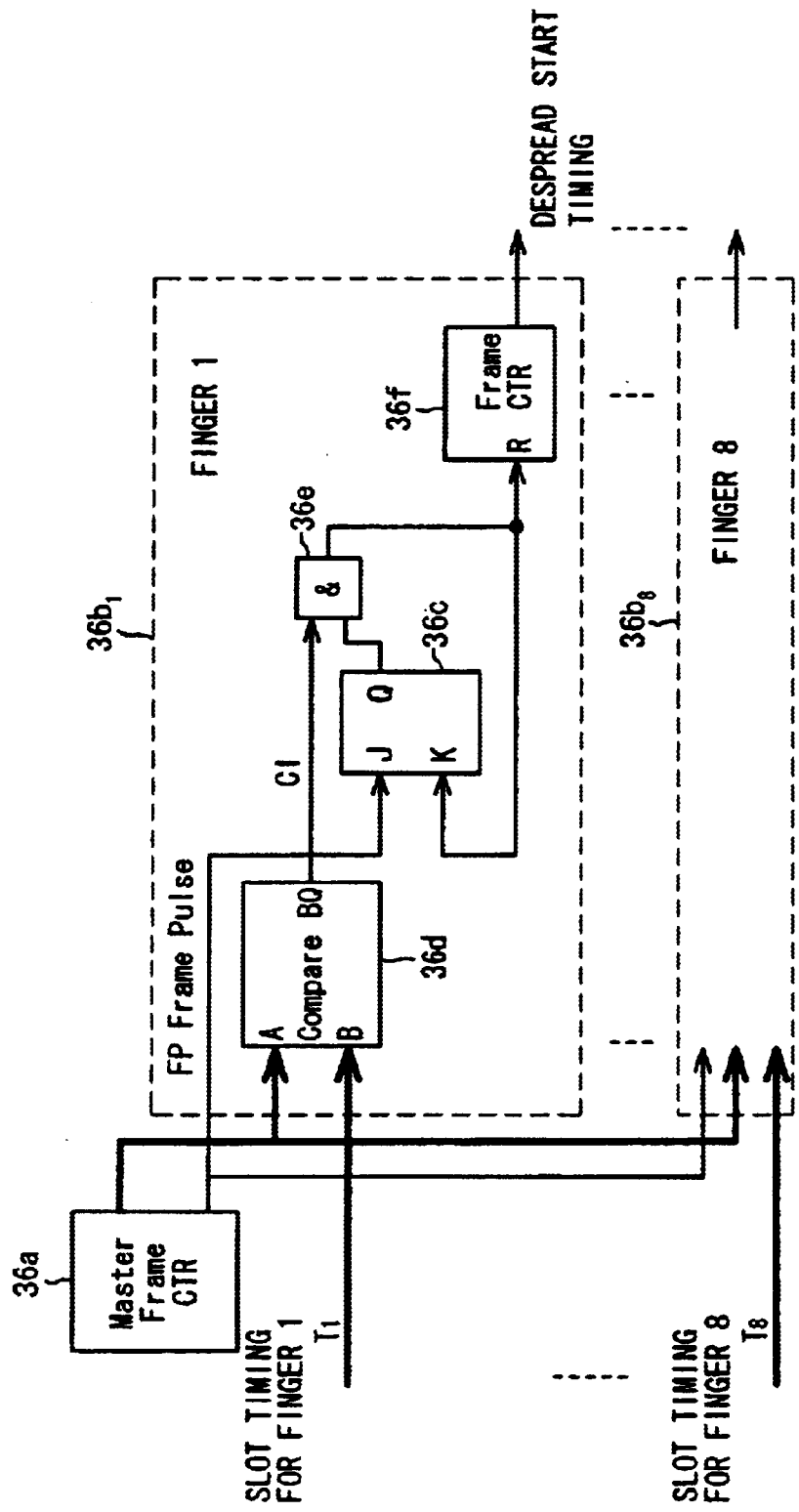
FIG. 11 is a schematic view of the despreading timing generation section.

FIG. 11 is a schematic view of the timing generation section 36. The master frame counter 36a counts the master clock and generates a frame pulse FP at each frame period. In the despreading timing generation parts $36b_1$, to $36b_8$, the J-K flip-flop 36c is set by the frame pulse FP, and the comparator 36d outputs a high-level coincidence signal CI when the count value of the counter 36a and the desired signal detection time $T_1$ to $T_8$ coincide; the AND gate 36e resets the frame counter 36f when a coincidence signal CI occurs. The frame counter 36f counts the master clock, and each time the value becomes zero, outputs a despreading timing signal $t_1$.

(d) Timing Control Unit (1) Calculating Section

Figure 12:
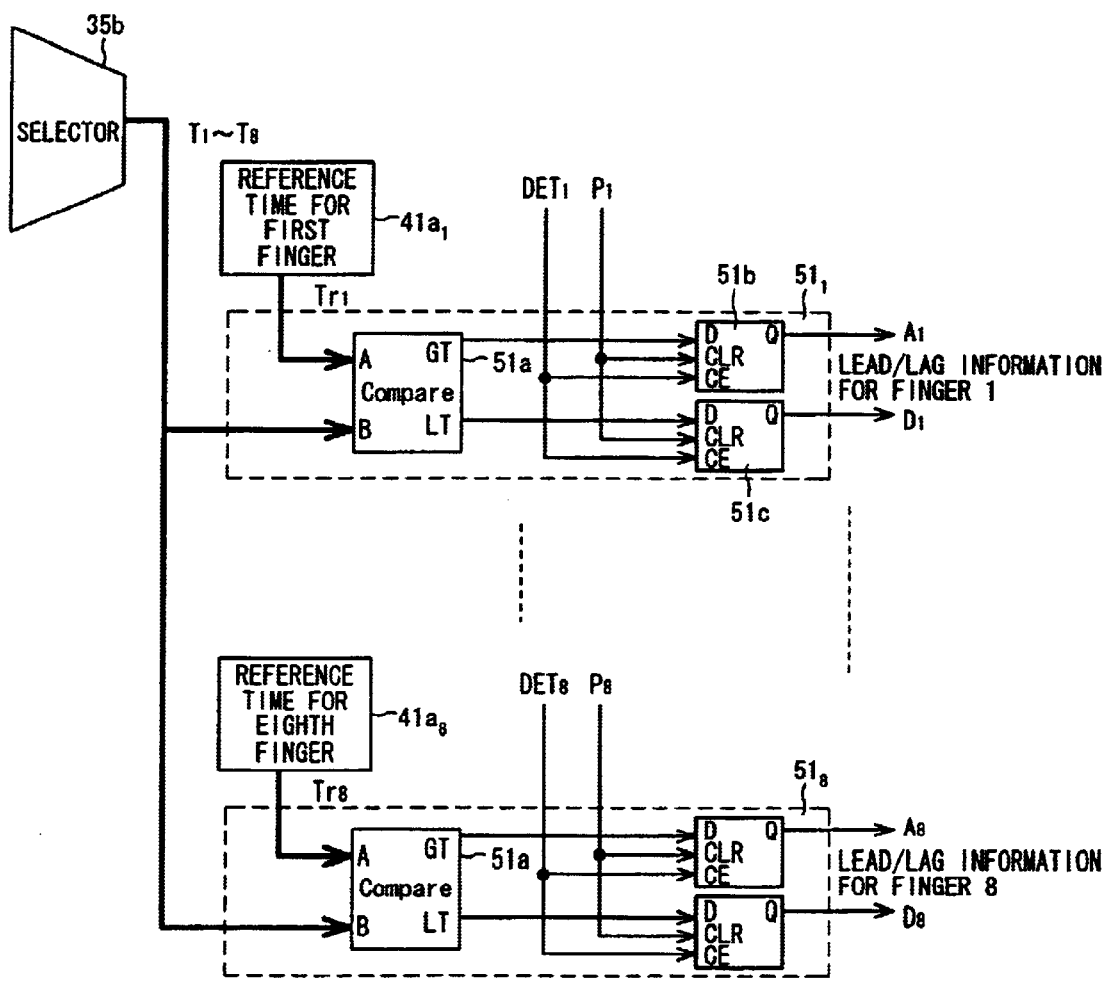
FIG. 12 is a schematic view of the calculating section in the timing control unit.

FIG. 12 is a schematic view of the calculating section 51 in the timing control unit 14 (FIG. 4). The calculating section 51 has first through eighth calculating parts $51_1$ through $51_8$, corresponding to the first through eighth finger units. The comparator 51a of each calculating part $5_1$, to $51_8$ compares the desired signal detection time $T_1$ to $T_8$ output in sequence from the selector 35b (cf. FIG. 9) and the reference time Trj (j=1 to 8) stored in the storage elements $41a_1$ to $41a_8$, and if the reference time is larger, outputs a high-level phase-lead signal (corresponding to the numerical value 1) from the output terminal GT, but if the reference time is smaller, outputs a high-level phase-lag signal (corresponding to the numerical value 1) from the output terminal LT; if they are equal, no signal is output from either terminal.

The registers 51b, 51c in each of the calculating parts $51_1$, to $51_8$ are cleared by the forced capture signal $P_1$ to $P_8$, and when it is inferred that the path selected this time and one of the paths allocated previously to the first through the eighth finger unit is identical ($DET_1$ to $DET_8$="1"), stores the output signal (numerical value 1 or 0) of the comparator 51a, for output as phase-lead information $A_1$ to $A_8$ or as phase-lag information $D_1$ to $D_8$.

By means of the above, when a path selected this time is judged to be identical to a path previously allocated to the jth finger unit, the calculating part 51j corresponding to the jth finger unit calculates the difference between the detection time this time and the reference time Tri, and according to the result outputs a 1 or 0 as phase-lead information or phase-lag information.

(2) Timing Control Circuit (2-1) First Embodiment

Figure 13:
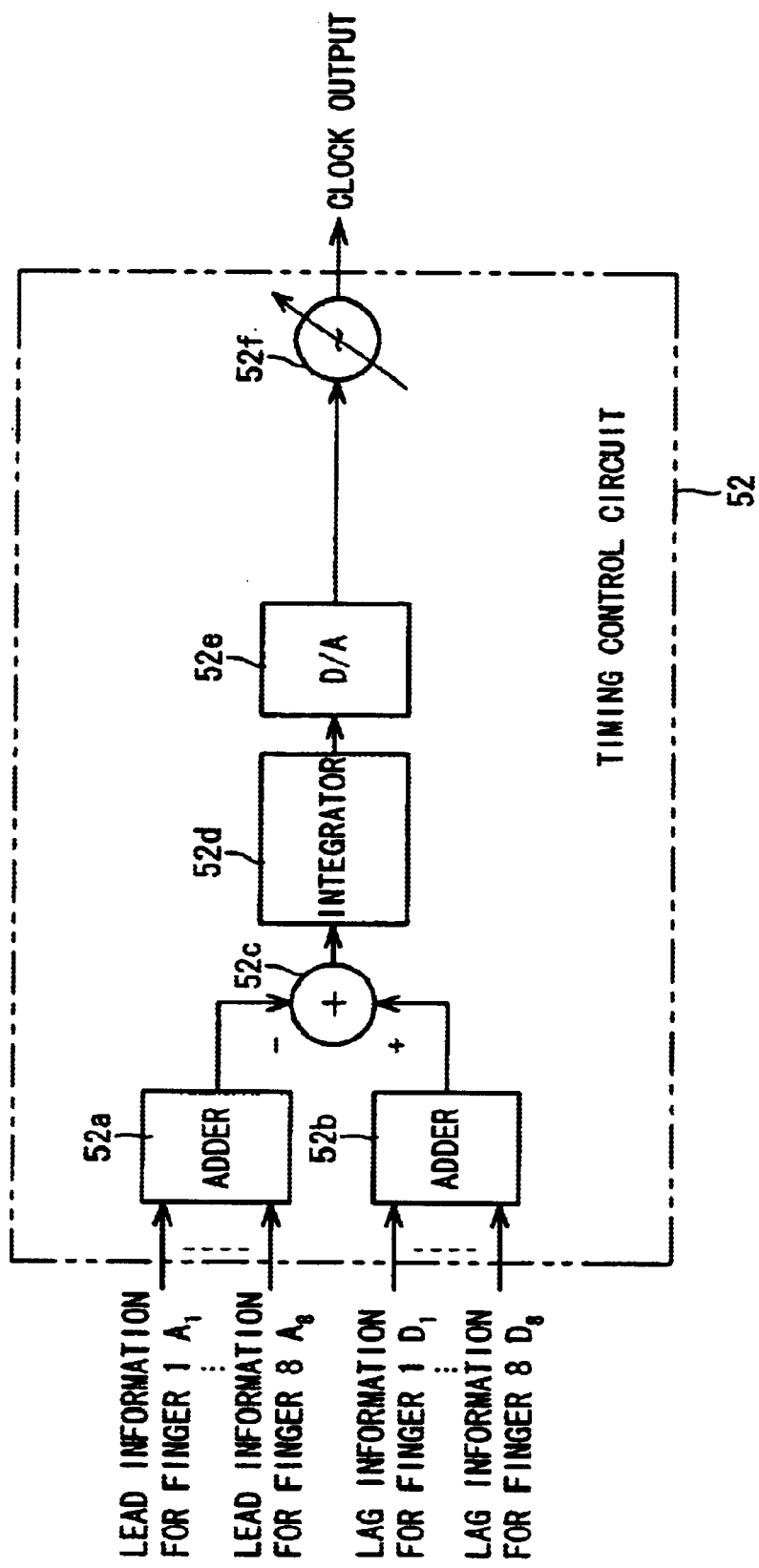
FIG. 13 is a first schematic view of the timing control circuit in the timing control unit.

FIG. 13 is a first embodiment of the timing control circuit 52 in the timing control unit 14 (FIG. 4). In this first embodiment, all paths are treated equally, and the oscillation frequency of the clock generator which generates the system clock is directly controlled according to the phase lead or lag in order to make the phase change zero (maintain synchronization).

The first adder circuit 52a adds eight phase lead information items $A_1$ to $A_8$, and the second adder circuit 52b adds eight phase lag information items $D_1$ to $D_8$. The calculating part 52c subtracts the addition results of the first and second adder circuits, the integration circuit 52d integrates the calculated results, and the D/A converter 52e converts the integrated result into analog data to control the oscillation frequency of the VCO-based clock generator 52f.

If the phase lead ahead of the reference time is large, the output of the first adder circuit 52a becomes large, and if the phase lag behind the reference time is large, the output of the second adder circuit 52b becomes large. Hence the output of the calculating part 52c and integrating circuit 52d changes according to the extent of the phase lead or lag, and as a result the oscillation frequency of the clock generator 52f changes such that the phase change becomes zero. That is, when the timing changes and the phase lags or leads as a result of fluctuations in the clock frequency, changes in the distance between transmitter and receiver, or other causes, the A/D converter output becomes positive or negative, and feedback control is performed such that the phase change becomes zero.

(2-2) Second Embodiment

Figure 14:
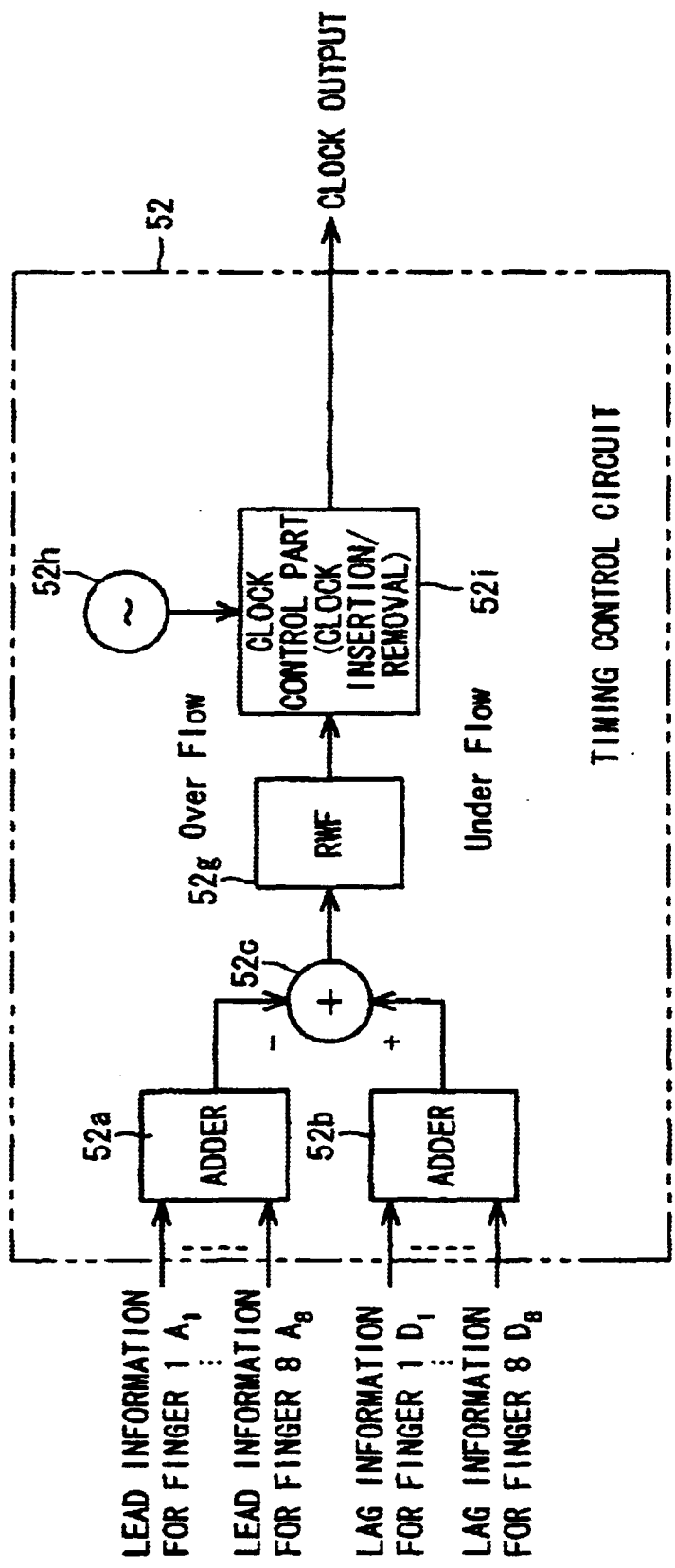
FIG. 14 is a second schematic view of the timing control circuit in the timing control unit.

FIG. 14 shows a second embodiment of the timing control circuit 52; a high-frequency oscillator is used as an oscillator generating the master clock, and pulses are inserted or removed according to the phase lead or lag, to control the clock frequency such that the phase change is zero (synchronization is maintained).

The first adder circuit 52a adds eight phase lead information items $A_1$ to $A_8$, and the second adder circuit 52b adds eight phase lag information items $D_1$ to $D_8$. The calculating part 52c subtracts the addition results of the first and second adder circuits, and the RWF (random walk filter) circuit 52g adds the calculated results, and when the capacity is exceeded, outputs an overflow or underflow. The fast clock oscillator 52h generates a fast master clock at two times or greater than the required system clock frequency. The clock control part 52i frequency-divides (normally by two) the pulses output from the clock oscillator 52h, to generate a system clock pulse with the prescribed frequency; in addition, when there is a phase lag and an overflow is output from the RWF circuit 52g, additional pulses are inserted into the system clock pulses to raise the clock frequency, and when there is a phase lead and an underflow is output from the RWF circuit 52g, pulses are removed from the system clock pulses to lower the clock frequency.

In this way, the clock control part 52i controls the clock frequency such that the phase change is zero. That is, if the timing changes and there is a phase lead or lag due to fluctuations in clock frequency, changes in the distance between transmitter and receiver, or other causes, feedback control is performed such that the phase change is zero.

In order to insert or remove clock pulses, the master clock must be fast, at two or more times the necessary system clock frequency; however, analog components can be eliminated. And as the integration circuit, a RWF circuit or other circuit which does not maintain frequency information can be used.

(2-3) Third Embodiment

Figure 15:
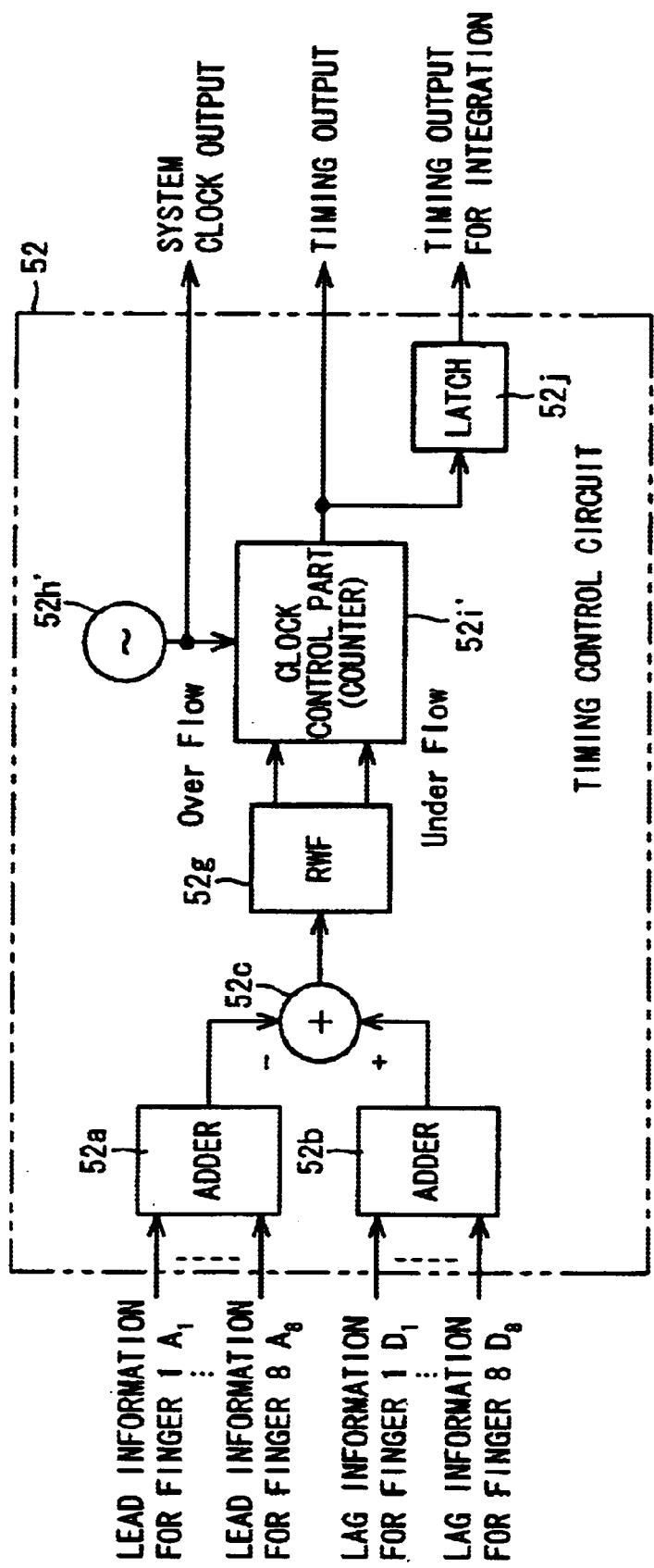
FIG. 15 is a third schematic view of the timing control circuit in the timing control unit.

FIG. 15 shows a third embodiment of the timing control circuit 52; in this configuration, the operation of the clock control part 52i of the second embodiment is modified from clock pulse insertion/removal to clock enable operation.

The first adder circuit 52a adds the eight phase lead information items $A_1$ to $A_8$, and the second adder circuit 52b adds the eight phase lag information items $D_1$ to $D_8$. The calculating part 52c subtracts the addition results of the first and second adder circuits, and the RWF circuit 52g adds the calculation results, and outputs an overflow or underflow if the capacity is exceeded. The clock control part 52i' has a preset counter function, and frequency-divides the system clock generated by the clock oscillator 52h' to output a timing pulse having a frequency corresponding to the preset value, for example, a frame pulse. The clock control part 52i' increases the preset value to cause a phase lead in the timing pulse when a phase lag occurs and an overflow is generated by the RWF circuit 52g, and decreases the preset value to cause a phase lag in the timing pulse when a phase lead occurs and the RWF circuit 52g generates an underflow.

In this way, the clock control part 52i' controls the clock frequency such that the phase change is zero. That is, if the timing changes and there is a phase lead or lag due to fluctuations in clock frequency, changes in the distance between transmitter and receiver, or other causes, feedback control is performed such that the phase change is zero.

In the second embodiment, the master clock had to be fast, at two or more times the frequency of the system clock, in order to insert or remove clock pulses. In the third embodiment, a slower clock oscillator comparable to the system clock can be configured. However, there is the problem that jitter is increased, and so frequency-division by the counter 52$j$ and output of timing pulses for integration or similar should be used as appropriate.

(2-4) Fourth Embodiment

The timing control circuits of the above first through third embodiments perform timing control according to the difference in the number of paths with phase leads and the number of paths with phase lags, regardless of the number of valid paths. However, the electromagnetic wave environment changes according to the position of the mobile equipment, and the number of multiple paths changes. Hence in an environment without multiple paths, the number of paths inferred to be the same previously and this time (the number of follow-up paths) is at most 1, but in a multipath environment, the number of follow-up paths varies in the range 1 to 8. Consequently, the timing control circuits of the first through third embodiments have high timing control sensitivity in a multipath environment, and in an environment without multiple paths the timing control sensitivity falls. Hence in a fourth embodiment, the calculating part output is normalized according to the number of follow-up paths (number of valid paths), so that the timing control sensitivity does not depend on the electromagnetic wave environment.

Figure 16:
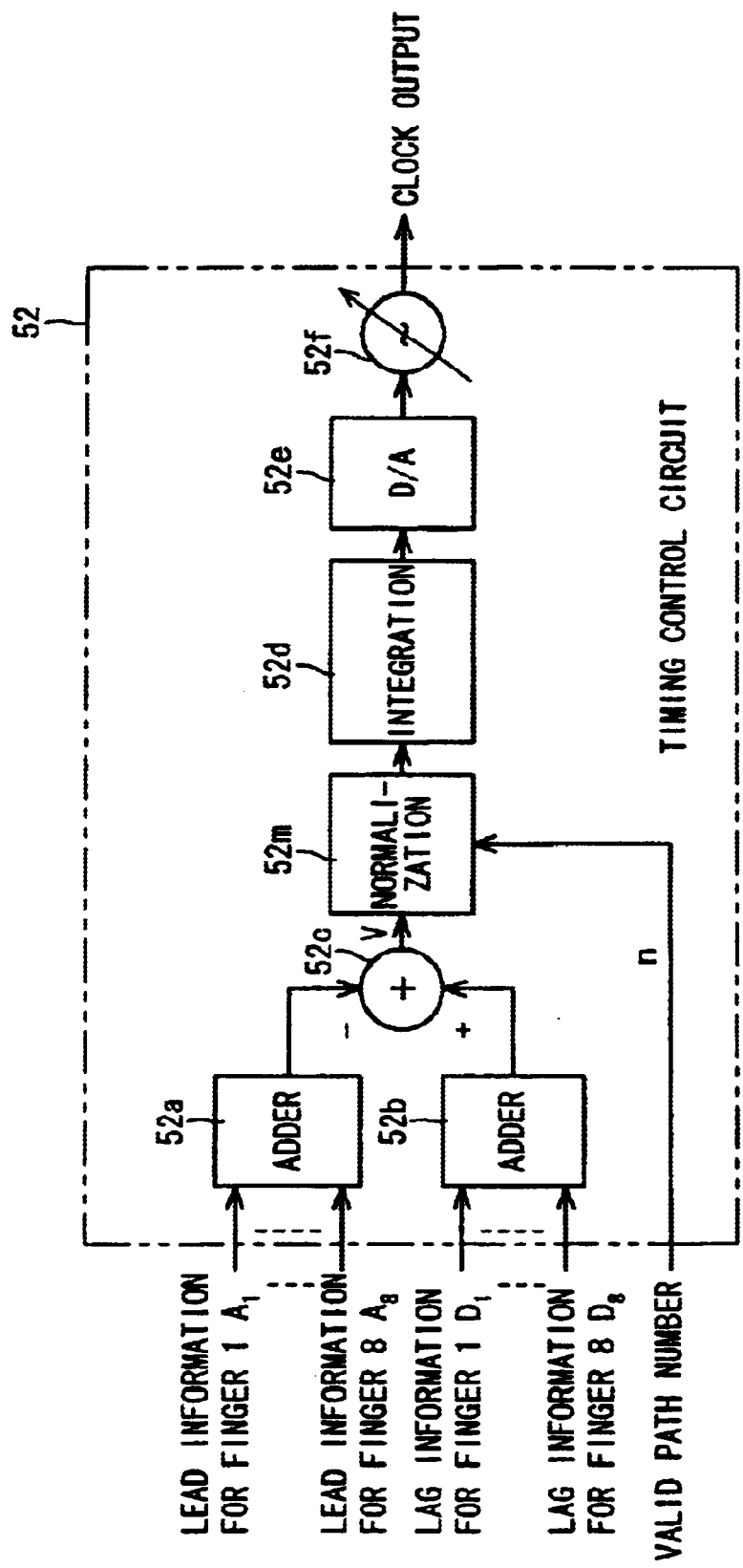
FIG. 16 is a fourth schematic view of the timing control circuit in the timing control unit.

FIG. 16 shows a fourth embodiment of the timing control circuit 52; apart from the normalizing part 52$m$, the configuration is the same as in the first embodiment.

The first adder circuit 52$a$ adds the eight phase lead information items $A_1$ to $A_8$, and the second adder circuit 52$b$ adds the eight phase lag information items $D_1$ to $D_8$. The calculating part 52$c$ subtracts the addition results of the first and second adder circuits, and the normalizing part 52$m$ normalizes the calculating part output V based on the number of valid paths n. The integration circuit 52$d$ integrates the normalized output of the normalizing part 52$m$, and the D/A converter 52$e$ converts the integration result into analog data, to control the oscillation frequency of the VCO-based clock generator 52$f$.

The normalization calculation in the normalizing part 52$m$ is performed by determining a value α for normalization from the table of FIG. 17, and multiplying by the calculated output V. In FIG. 17, the rows give the number of valid paths n, and the columns indicate the calculated result V; α is determined approximately by the equation $$\alpha = 128 \cdot V/n$$

The normalizing part 52$m$ determines α from the table and multiplies by the calculated result V to perform normalization, to render uniform the timing control sensitivity regardless of whether or not the environment is a multipath environment.

Figure 18:
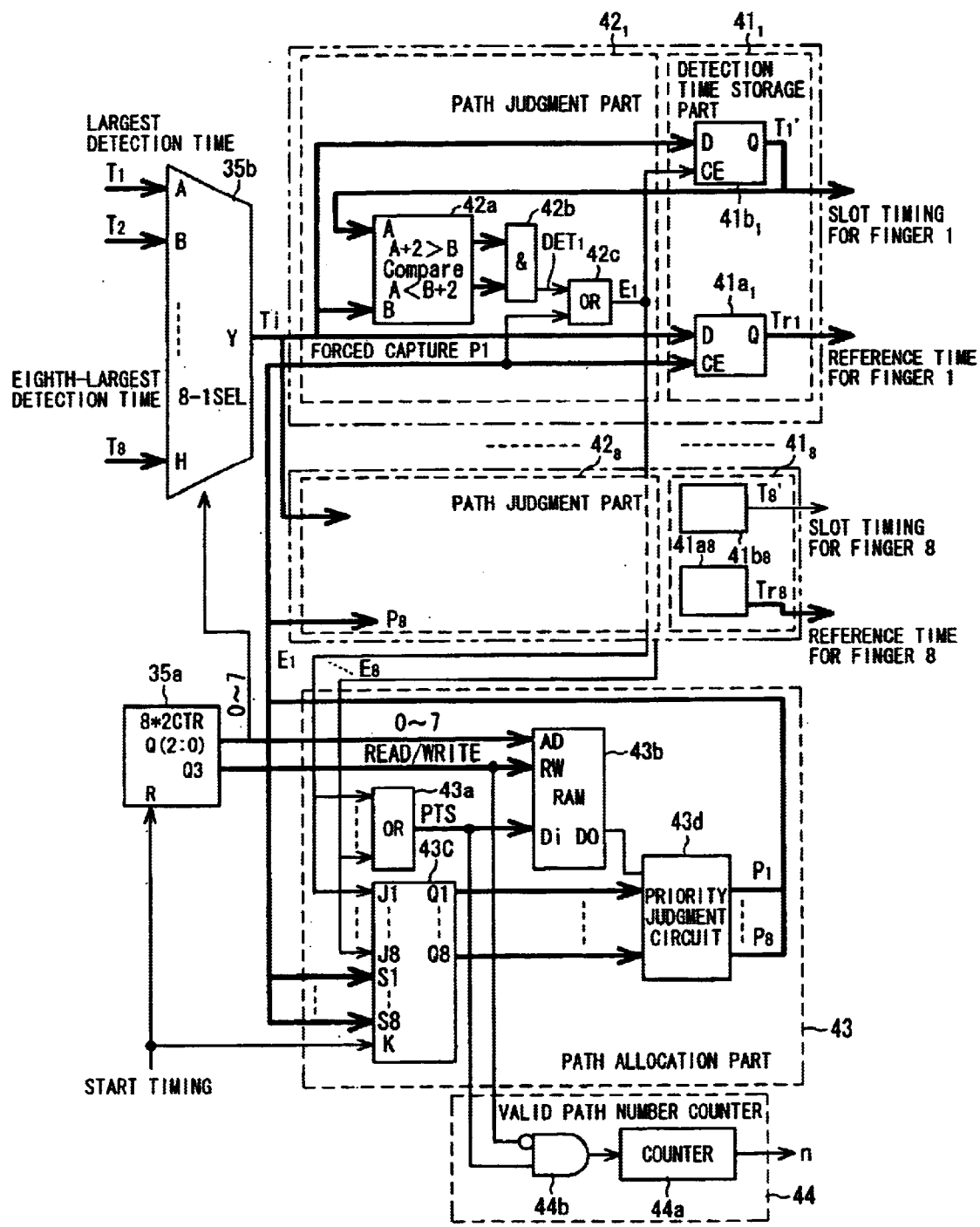
FIG. 18 is a schematic view of a path follow-up section comprising a valid path number counting unit.

FIG. 18 is a schematic view of a path follow-up section comprising a valid path number counting unit; parts which are the same as in FIG. 9 are assigned the same symbols. The OR circuit 43$a$ of the path allocation part 43 outputs a high-level path follow-up signal PTS if path identity is detected for any of the first through eighth path judgment parts $42_1$ to $42_8$. The counter 44$a$ of the valid path number counter 44 counts the number of follow-up paths by counting the number of path follow-up signals PTS output via the gate circuit 44$b$, and outputs the number of valid paths n.

Figure 19:
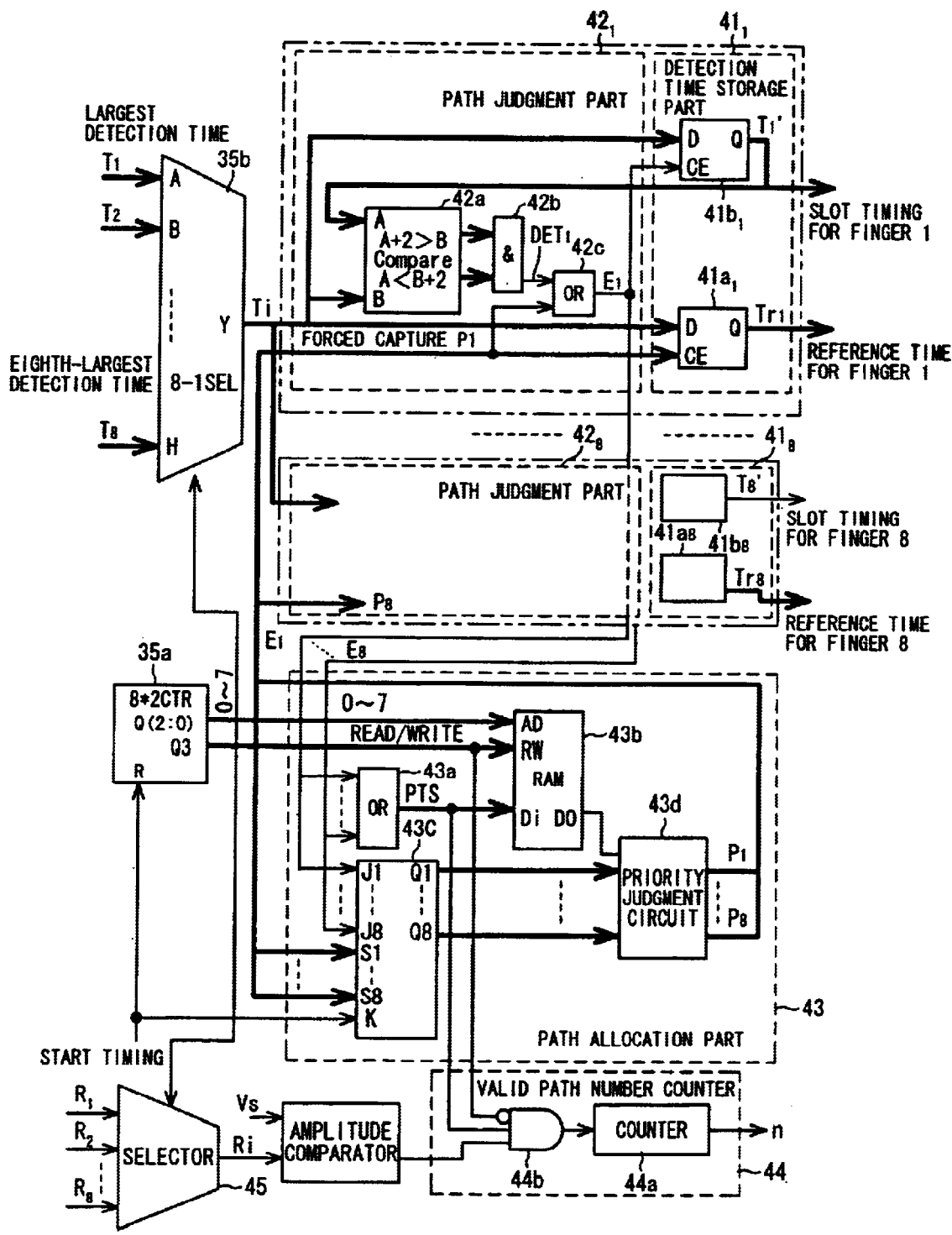
FIG. 19 is another schematic view of a path follow-up section comprising a valid path number counting unit.

In the above fourth embodiment, the number of follow-up paths was taken to be the number of valid paths; but the number of paths among the follow-up paths the correlation (reception level) of which is equal to or greater than a prescribed level can be taken as the number of valid paths. FIG. 19 is a schematic view of a path follow-up section comprising a valid path number counter for such a case; parts which are the same as in FIG. 18 are assigned the same symbols. The path selection section 34 (FIG. 8) inputs to the selectors 35$b$, 45 the detection times $T_1$ to $T_8$ and the correlations $R_1$ to $R_8$. The selector 35$b$ outputs the detection time Ti and simultaneously the selector 45 outputs the correlation Ri, and the amplitude comparator 46 compares the correlation Ri and the preset level $V_s$. The gate circuit 44$b$ of the valid path number counter 44 generates a path follow-up signal PTS, and outputs a high-level signal when the correlation Ri is equal to or greater than the preset level $V_s$; the counter 44$a$ counts the signal and outputs the count value as the number of valid paths n.

(3) Another Configuration of the Calculating Part

The calculating part 51 of FIG. 12 handles each of the paths equally, regardless of the magnitude of phase lags or leads or the desired signal reception level (correlation) to output phase information, but can be configured so as to output phase difference information with the phase lag/lead magnitude and reception level taken into account. The calculating part of FIG. 12 employs as a reference time the desired signal detection time over a path when the path has been newly allocated to a finger unit, but the reference time obtained from the base station can also be employed. In light of this, the following three configurations of the calculating part 51 are also conceivable.

(3-1) First Configuration

Figure 20:
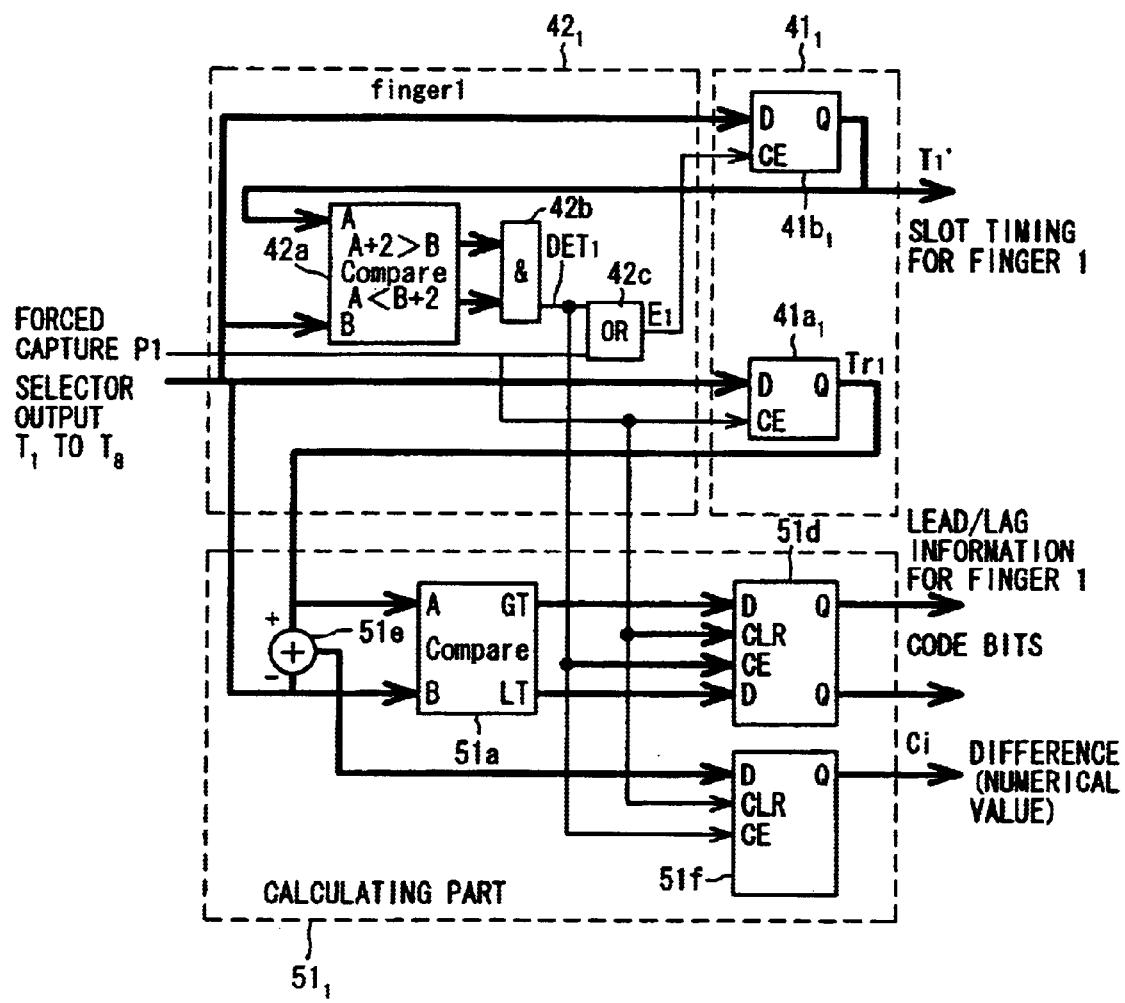
FIG. 20 is another schematic view of the calculating part (which outputs values according to phase differences), in the timing control unit.

In the first configuration, a numerical value Ci corresponding to phase time differences is output from the calculating parts $51_1$ to $51_8$ corresponding to the finger units. FIG. 20 is a schematic view of such a calculating part; only the calculating part $51_1$, corresponding to the first finger unit is shown, but the calculating parts $51_2$ to $52_8$ for the other finger units have the same configuration.

The comparator 51$a$ of the calculating part $5_1$, compares the desired signal detection times $T_1$ to $T_8$ for this time, output in sequence from the selector 35$b$ (cf. FIG. 9), with the reference time $Tr_1$ stored in the storage element $41a_1$, and if the reference time is larger, outputs a high-level phase-lead signal from the output terminal GT, but if the reference time is smaller, outputs a high-level phase-lag signal from the output terminal LT. Also, the calculating part 51$e$ calculates the difference between the reference time $Tr_1$ and the desired signal detection times $T_1$ to $T_8$ (phase time differences).

The register 51$d$ is cleared by the forced capture signal $P_1$, and when it is inferred that the path selected this time and the path previously allocated to the first finger unit are identical ($DET_1$="1"), stores a lead phase signal from the comparator 51$a$ as +1 and a lag phase signal as −1.

The register 51$f$ is cleared by the forced capture signal $P_1$, and when it is inferred that the path selected this time and the path previously allocated to the first finger unit are identical ($DET_1$="1"), stores the detection time difference Ci output from the calculating part 51$e$.

Thereafter, the timing control circuit 52 totals the numerical values Ci corresponding to the phase time differences output from the calculating parts $51_1$ to $51_8$, and controls timing based on the total value.

(3-2) Second Configuration

Figure 21:
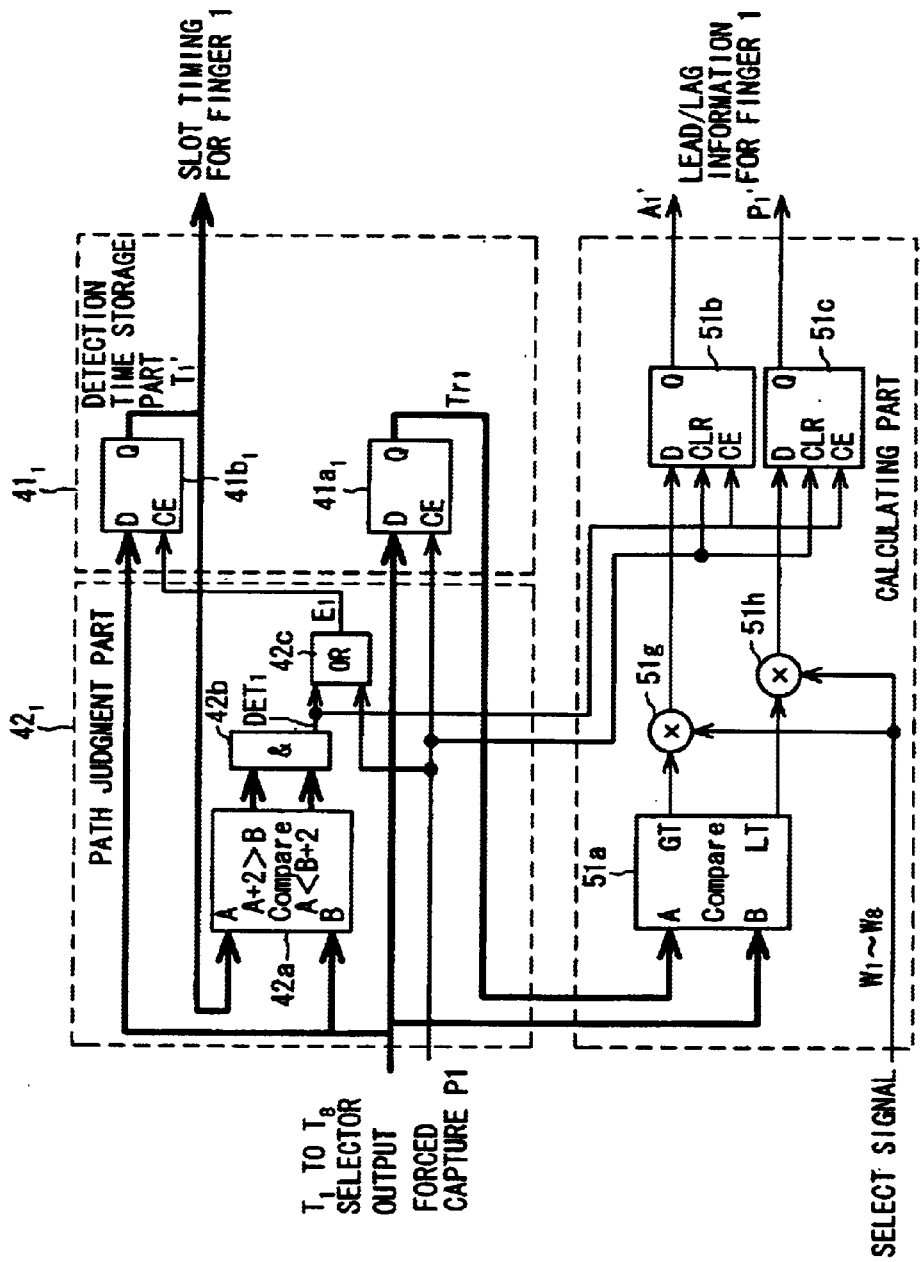
FIG. 21 is another schematic view of the calculating part (which performs weighting according to received level), in the timing control unit.

In the second configuration, a 1, 0 leading-phase information item Aj (j=1 to 8) or lagging-phase information item Bj (j=1 to 8) is output according to whether the detection time leads or lags the reference time, and this output is weighted according to the correlation (reception level). FIG. 21 is a schematic view of the calculating part; only the calculating part $51_1$, corresponding to the first finger unit is shown, but the calculating parts $51_2$ to $51_8$ corresponding to the other finger units have the same configuration. The calculating part of FIG. 21 has the same configuration as the calculating part of FIG. 12, except for the weighting calculation elements $51g$, $51h$.

The comparator $51a$ of the calculating part $51_1$ compares the desired signal detection times $T_1$ to $T_8$ for this time, output sequentially from the selector $35b$, with the reference time $Tr_1$ stored in the storage element $41a_1$, outputs a high-level phase-lead signal from the output terminal GT if the reference time is greater, outputs a high-level phase-lag signal from the output terminal LT if the reference time is smaller, and does not output a signal from either terminal if the two are equal.

The calculating elements $51g$, $51h$ multiply the phase-lead signal and phase-lag signal by weighting data wi, based on the respective correlations, and output the result. Each of the registers $51b$, $51c$ is cleared by the forced capture signals $P_1$ to $P_8$, and if it is inferred that the path selected this time is identical to the path previously allocated to the first finger unit ($DET_1$="1"), stores the numerical values output from each of the calculating elements $51g$, $51h$, and outputs these values as the phase-lead information item $A_1'$ and the phase-lag information item $D_1'$. The detection times $T_1$ to $T_8$ are in correlation order, so that, for example, the weights $w_1$, to $w_8$ may be set to from 8 to 1.

The timing control circuit 52 totals the phase-lead information items $A_1'$ to $A_8'$ and phase-lag information items $D_1'$ to $D_8'$ output from the calculating elements $51_1$ to $51_8$, and controls the timing based on the total value.

(3-3) Third Configuration

In the third configuration, a prescribed timing obtained from the base station is used as the reference time to output the phase difference information.

Prior to communication with the base station, the mobile equipment must discriminate the base station code. To do so, the mobile equipment follows a prescribed procedure to acquire the base station code; in the process of acquisition of this base station code, the frame timing (reference timing) of the base station is obtained. Hence by storing this base station frame timing as the reference time Tr, phase difference information can be output according to whether the desired signal detection time leads or lags the reference time Tr.

Figure 22A:
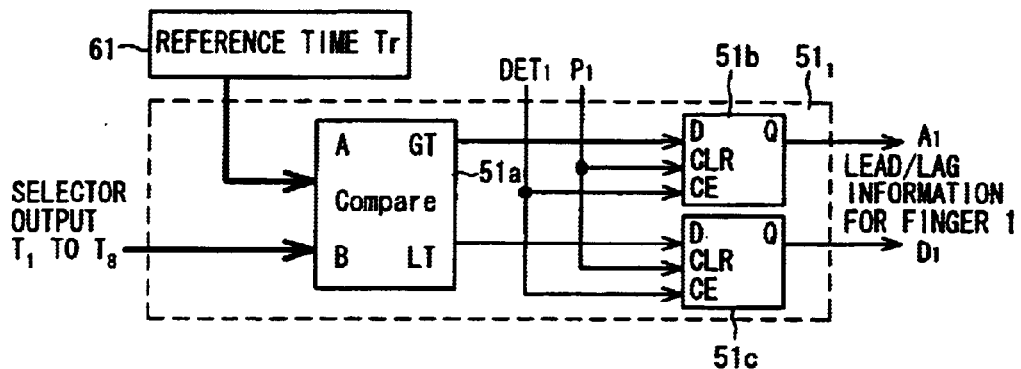
FIG. 22A to FIG. 22C are another schematic views of the calculating part (with fixed reference time), in the timing control unit.
Figure 22B:
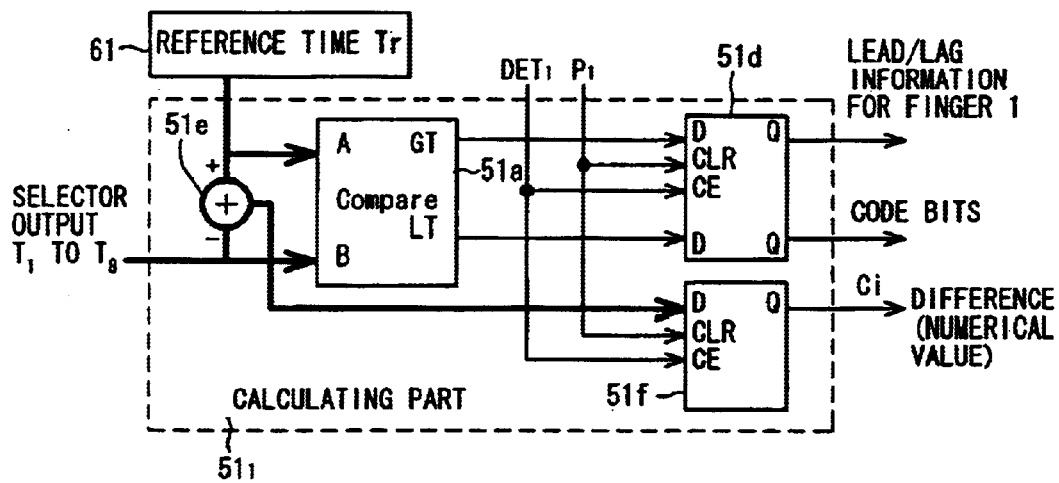
Figure 22C:
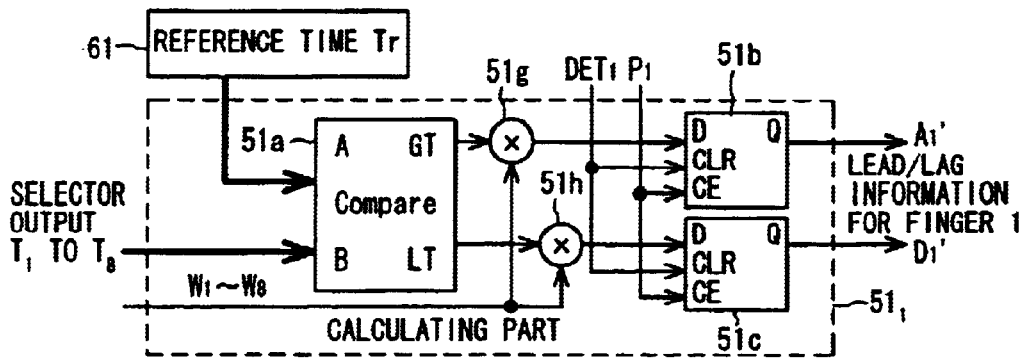

FIG. 22A to FIG. 22C are schematic views of the calculating part for the case in which the frame timing of the base station is used as the reference time Tr; only the calculating part $51_1$ corresponding to the first finger unit is shown, but the other calculating parts $51_2$ to $52_8$ have the same configuration. 61 is the reference time storage part.

FIG. 22A is an example in which, in FIG. 12, the base station frame timing is used as the reference time Tr; the configurations of FIG. 13 through FIG. 16 can be used as the next-stage timing control circuit.

FIG. 22B is an example in which, in FIG. 20, the base station frame timing is used as the reference time Tr; the configurations of FIG. 13 through FIG. 15 can be used as the next-stage timing control circuit.

FIG. 22C is an example in which, in FIG. 21, the base station frame timing is used as the reference time Tr; the configurations of FIG. 13 through FIG. 15 can be used as the next-stage timing control circuit.

As explained above, when the overall initial reference timing is determined by a calculating part of FIG. 22, by synchronizing the timing such that this reference timing becomes the central value of the follow-up timing for each finger, newly generated paths within the MF tap length can be detected without omissions.

By means of the above, the phase of the spreading code train on the transmission side can be detected with a precision of within 1 chip by the path search unit 13 (synchronization acquisition), and subsequently the timing control unit 14 can control the lead or lag of the timing signal (synchronization tracking).

By means of this invention, if the path assigned till then to a finger unit is identical to a path selected this time, the allocation of the path to the finger unit is not changed, so that data loss occurring at the time of path allocation can be prevented. Further, path identity can be judged according to whether the detection time difference is within an allowable range (one chip duration), so that the precision of inference of path identity can be improved.

Also, by means of this invention, the phase of the spreading code train on the transmission side can be detected within a precision of within 1 chip by the path search unit (synchronization acquisition), and moreover the timing signal lead/lag can be controlled based on the total value of the differences between the detection time this time and the reference time for the same path (synchronization tracking), so that even if changes in the distance between transmitter and receiver or fluctuations in the system clock occur, the timing of each component can be synchronized with the reference timing, and a DLL circuit can be rendered unnecessary. As the reference time, either (1) the desired signal detection time for the path when a path is newly allocated to a finger unit can be used as the reference time, or (2) the base station frame timing or similar, detected at the time of initiation of communication with the base station, can be used as the reference time.

By means of this invention, the time difference is +1 or −1 according to whether the detection time this time is later than or earlier than the reference time, and the timing lead or lag is controlled based on the total of time differences for each identical path, so that the hardware configuration can be simplified.

By means of this invention, time differences are weighted based on the magnitude of the correlation this time, and the timing lead or lag is controlled based on the total of weighted time differences for each identical path, so that timing control (synchronization tracking control) with greater weighting for paths with larger correlations is possible.

By means of this invention, the number of paths judged to be identical is detected, time differences are weighted based on the number of identical paths, and the timing lead or lag is controlled based on the total of weighted detection time differences, so that timing control (synchronization tracking control) can be performed with approximately the same sensitivity even if the electromagnetic wave environment (multipath environment) changes.

By means of this invention, time differences are weighted based on the number of paths which are judged to be identical paths and the correlation of which is equal to or greater than a prescribed level, and the timing lead or lag is controlled based on the total of weighted detection time differences, so that timing control (synchronization acquisition control) can be performed taking the electromagnetic wave environment into consideration.

By means of this invention, a voltage-controlled oscillator (VCO) can be controlled based on the total of time differences to control the system clock frequency, and easily control the timing.

By means of this invention, pulses output from a fast clock oscillator are frequency-divided to generate the system clock, and by inserting and removing pulses, the system clock frequency is controlled, so that analog elements can be eliminated and the timing can be controlled digitally.

By means of this invention, the system clock is frequency-divided to generate various timing signals, and the preset numerical value (frequency-division factor) is changed based on the phase difference to control the timing lead or lag, so that the timing can be controlled digitally, and a fast clock oscillator can be made unnecessary.

In the above, the present invention has been explained through embodiments, but various modifications are possible in accordance with the essence of this invention described in the scope of claims, and the present invention does not exclude these modifications.

What is claimed is:

1. A CDMA receiver, having a plurality of despreading/delay adjustment units, each of which performs despreading processing of a desired signal arriving via an allocated path among multiple paths, adds a delay amount to a despread signal obtained from despreading processing according to the path, and outputs the result, a combining unit which combines the outputs of each despreading/delay adjustment unit, a path search unit which allocates paths to each despreading/delay adjustment unit and a timing control unit which controls timing; characterized in that said path search unit comprises:
  a correlation detection section, which detects a correlation, in each prescribed time interval, between a received signal and a desired signal;
  a path selection section, which selects a plurality of paths over which the desired signal arrives based on the peak level of said correlation, and which employs the peak detection time as the desired signal detection time;
  storage means, which stores, as a reference time, the desired signal detection time over a path when this path is newly allocated to a despreading/delay adjustment unit, and which stores the previous-time desired signal detection time for the path;
  a path judgment section, which, if the difference between the desired signal detection time in a path selected this time and the previous-time detection time is within an allowable range, judges that the path selected this time is identical to the path previously allocated to the prescribed despreading/delay adjustment unit; and,
  a path allocation section, which performs allocation of paths to each dispreading/delay adjustment unit such that, if the path selected this time is identical to the previously allocated path, despreading and delay adjustment processing of a desired signal arriving over this identical path is caused to be executed by the same despreading/delay adjustment unit as previously; and, said timing control unit comprises:
  a calculating section, which calculates the difference between the desired signal detection time this time, over said identical path, and said reference time; and,
  a timing control circuit, which controls the timing lead/lag based on the total of said detection time differences for each identical path.

2. The CDMA receiver according to claim 1, characterized in that
  in said timing control circuit, said detection time difference is made +1 or −1 according to whether the detection time this time is later or earlier than said reference time, and the timing lead or lag is controlled based on the total of said detection time differences for each identical path.

3. The CDMA receiver according to claim 1 characterized in that
  in said timing control circuit, said detection time differences are weighted based on the desired signal reception level in the path, and the timing lead or lag is controlled based on the total of the weighted detection time differences for each identical path.

4. The CDMA receiver according to claim 2, characterized in that
  in said timing control circuit, the number of paths judged to be identical paths is detected, the total is normalized based on the number of paths, and the timing lead or lag is controlled based on the value obtained.

5. The CDMA receiver according to claim 2, characterized in that
  in said timing control circuit, said total is normalized based on the number of the paths judged to be identical to previous paths whose correlation value is equal to or greater than a prescribed level, and the timing lead or lag is controlled based on the value obtained.

6. The CDMA receiver according to claim 1, characterized in that
  in said timing control circuit, a voltage-controlled oscillator (VCO) is controlled, based on the total of detection time differences, to control the frequency of a master clock, so that the timing lead or lag is controlled.

7. The CDMA receiver according to claim 1, characterized in that
  in said timing control circuit, a pulse output from a fast clock oscillator is frequency-divided to generate a prescribed clock signal, and clock pulses are inserted or removed, based on the total of said detection time differences, to control the prescribed clock frequency, so that the timing lead or lag is controlled.

8. The CDMA receiver according to claim 1, characterized in that a clock signal is frequency-divided to generate various timing signals, and the frequency-division factor is controlled, based on the total of said detection time differences, to control the timing lead or lag.

9. A CDMA receiver, comprising a plurality of despreading/delay adjustment units, each of which performs despreading processing of a desired signal arriving via an allocated path among multiple paths, adds a delay amount to a despread signal obtained from despreading processing according to the path, and outputs the result, a combining unit which combines the outputs of each despreading/delay adjustment unit, a path search unit which allocates paths to each despreading/delay adjustment unit, and a timing control unit which controls timing; characterized in that said path search unit comprises:
  a correlation detection section which detects a correlation, in each prescribed time interval, between a received signal and a desired signal;
  a path selection section, which selects a plurality of paths over which the desired signal arrives based on the peak level of said correlation, and which employs the peak detection time as the desired signal detection time;
  a path judgment section which, if the difference between the detection time of the desired signal arriving over a path selected this time and the previous-time detection time is within an allowable range, judges that the path selected this time is identical to the path previously allocated to the prescribed despreading/delay adjustment unit; and, a path allocation section which performs allocation of paths to each dispreading/delay adjustment unit such that, if the path selected this time is identical to the previously allocated path, despreading and delay adjustment processing of a desired signal arriving this identical path is caused to be executed by the same despreading/delay adjustment unit as previously; and, said timing control unit comprises:

means for storing reference times;

a calculating section, which calculates the difference between the desired signal detection time this time, over said identical path, and said reference time; and, a timing control circuit, which controls the timing lead/lag based on the total of said detection time differences for each identical path.

10. The CDMA receiver according to claim 9, characterized in that in said timing control circuit, said detection time difference is made +1 or −1 according to whether the detection time this time is later or earlier than said reference time, and the timing lead or lag is controlled based on the total of said detection time differences for each identical path.

11. The CDMA receiver according to claim 9, characterized in that in said timing control circuit, said detection time differences are weighted based on the desired signal reception level in the path, and the timing lead or lag is controlled based on the total of the weighted detection time differences for each identical path.

12. The CDMA receiver according to claim 10, characterized in that in said timing control circuit, the number of paths judged to be identical paths is detected, said total is normalized based on the number of paths, and the timing lead or lag is controlled based on the value obtained.

13. The CDMA receiver according to claim 10, characterized in that in said timing control circuit, said total is normalized based on the number of the paths judged to be identical to previous paths whose correlation value is equal to or greater than a prescribed level, and the timing lead or lag is controlled based on the value obtained.

* * * * *